March 9, 1965
C. J. HILL
3,172,148
POULTRY GIZZARD PROCESSING APPARATUS
Filed Oct. 30, 1963
9 Sheets-Sheet 2
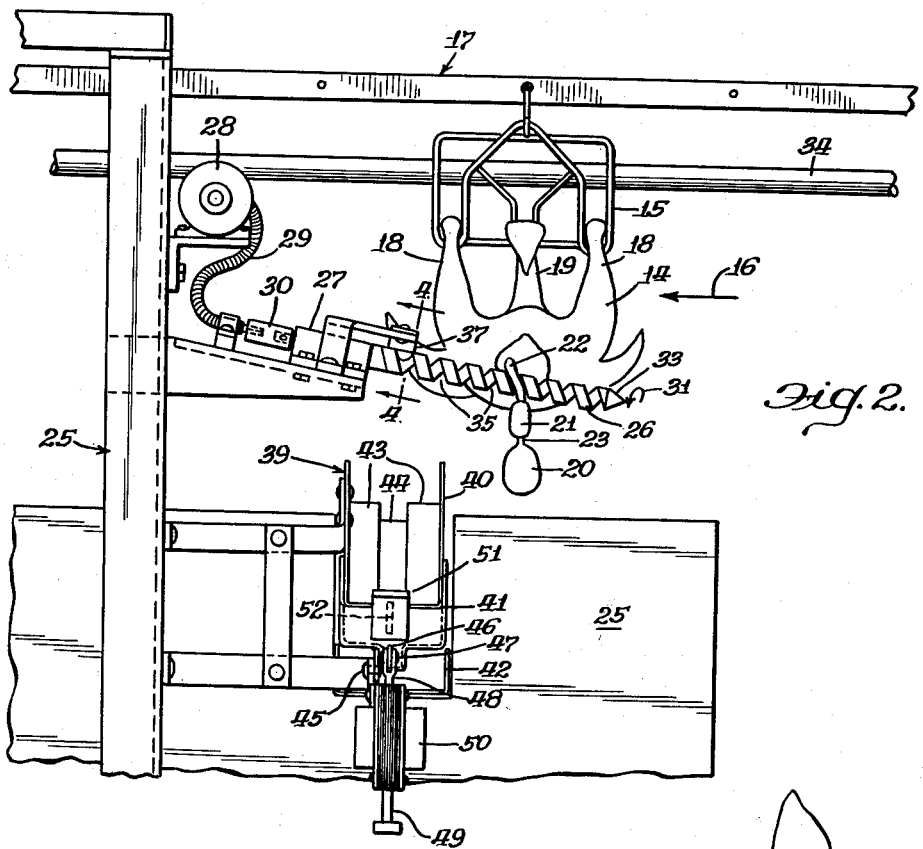
INVENTOR.
Carl J. Hill
BY
Darbo, Robertson &
Vandenburgh   Attys.

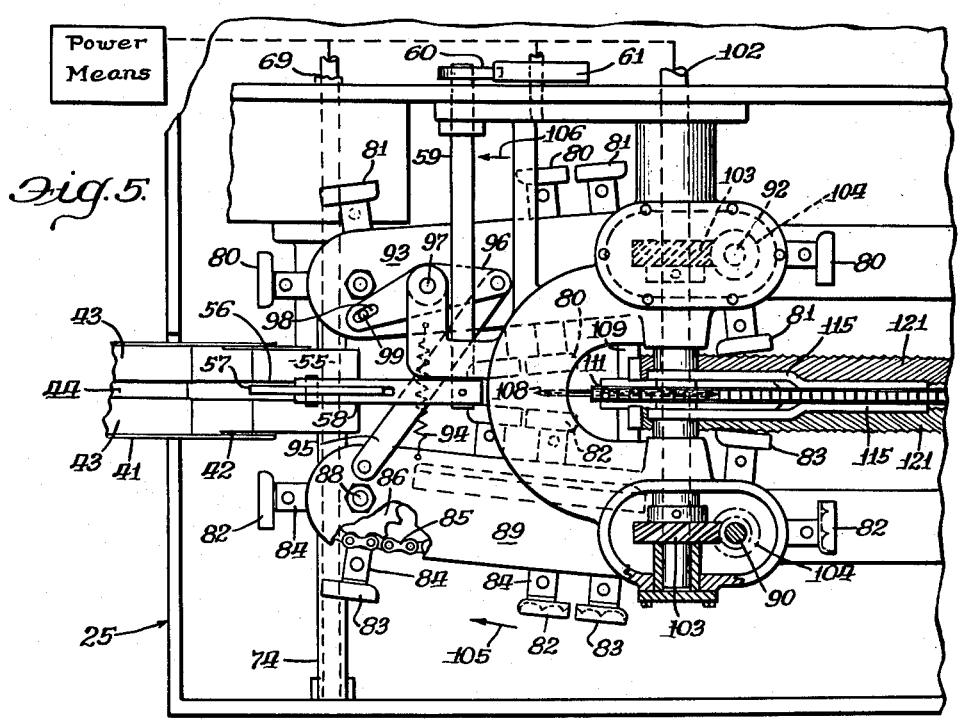
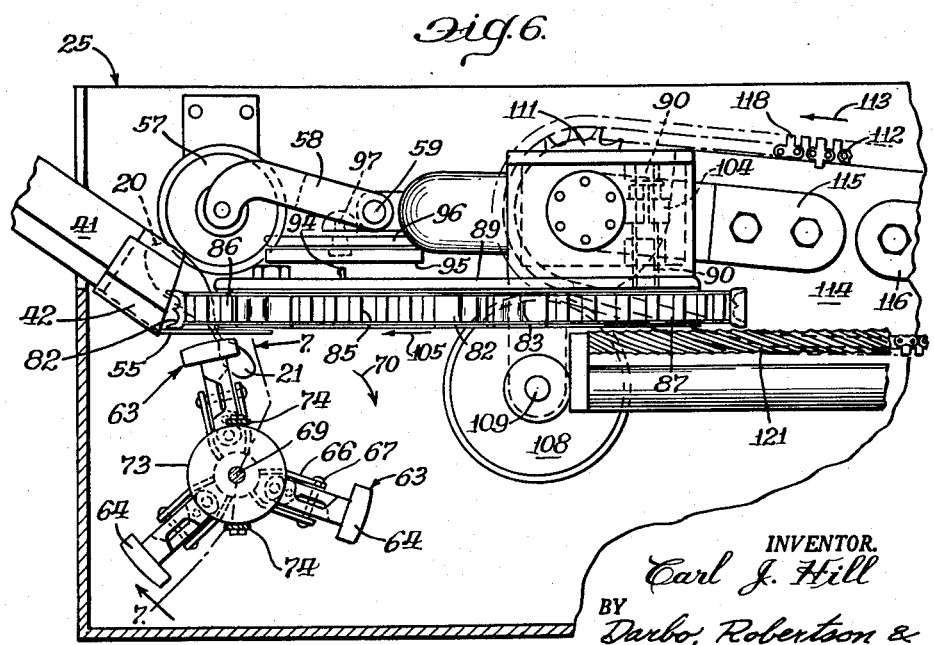

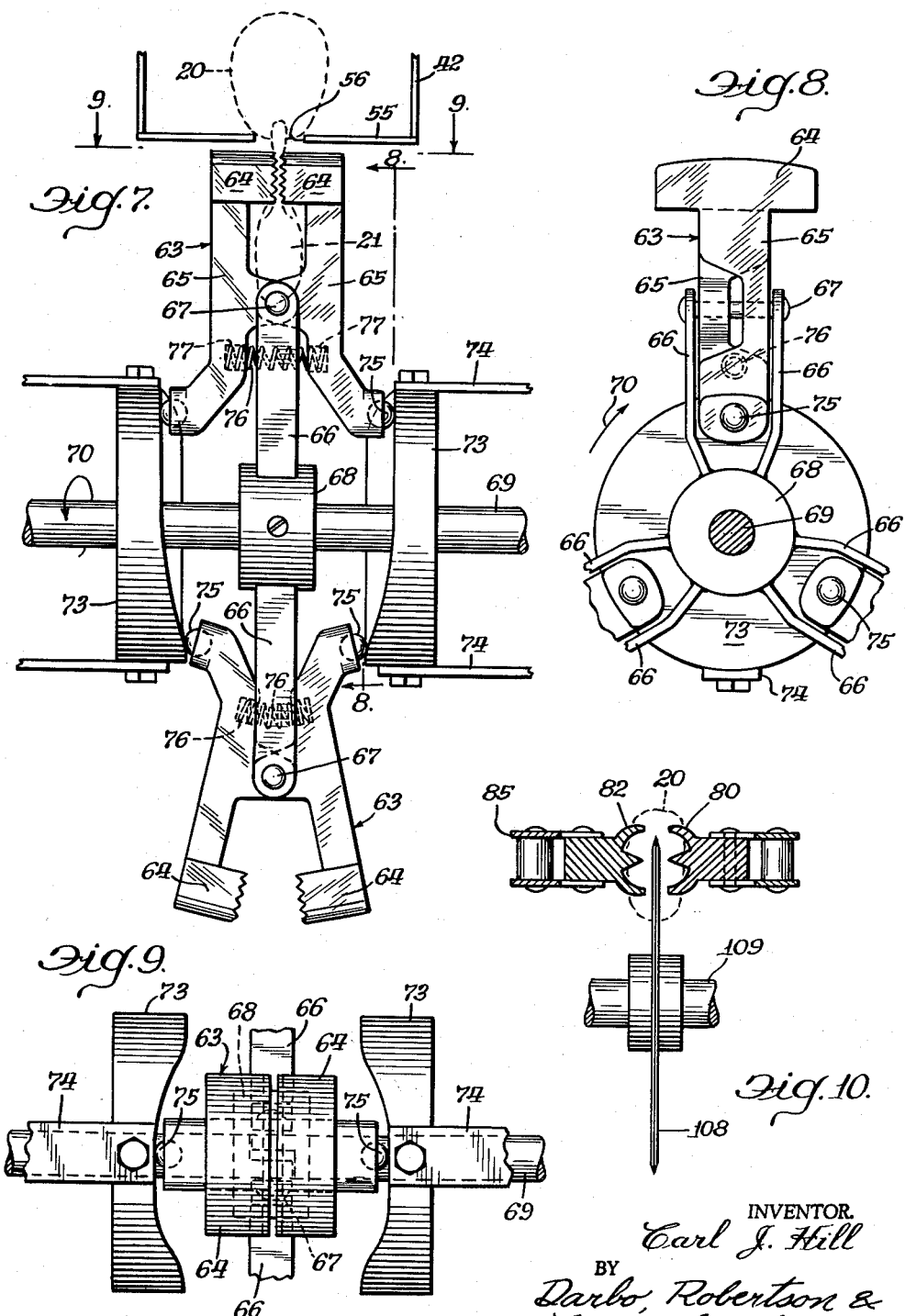

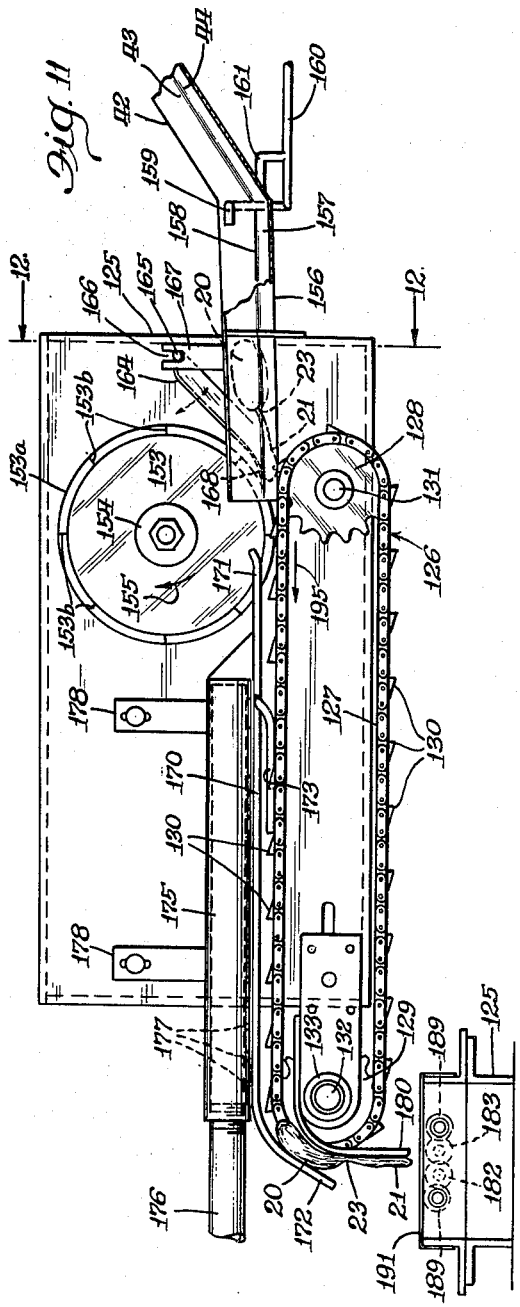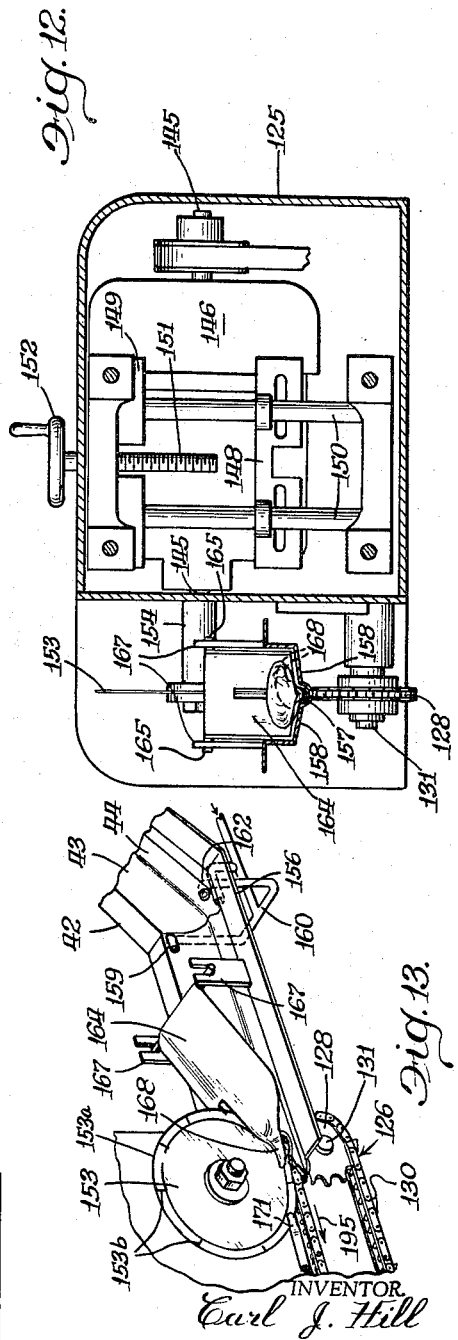

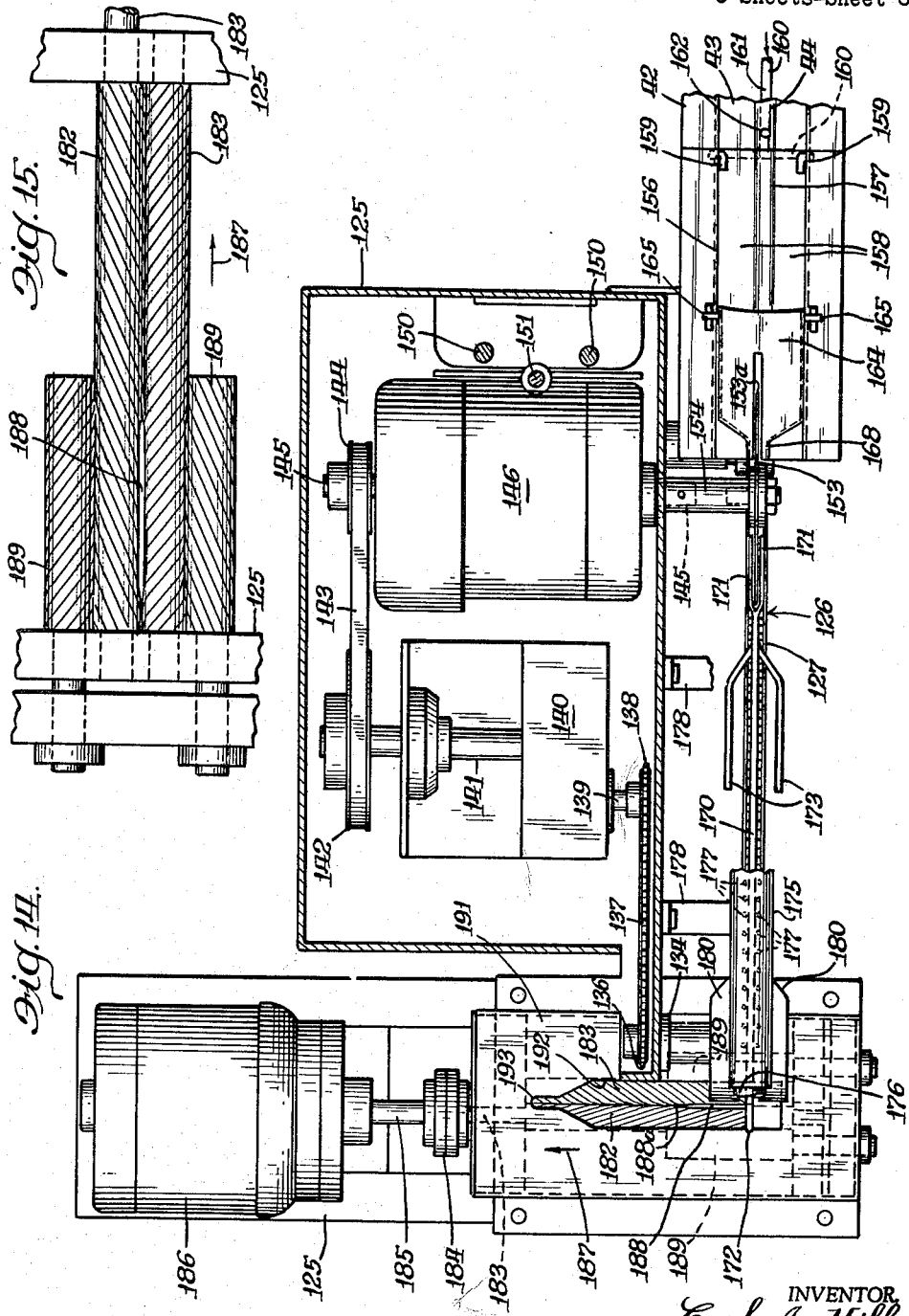

March 9, 1965 C. J. HILL 3,172,148
POULTRY GIZZARD PROCESSING APPARATUS
Filed Oct. 30, 1963 9 Sheets-Sheet 7
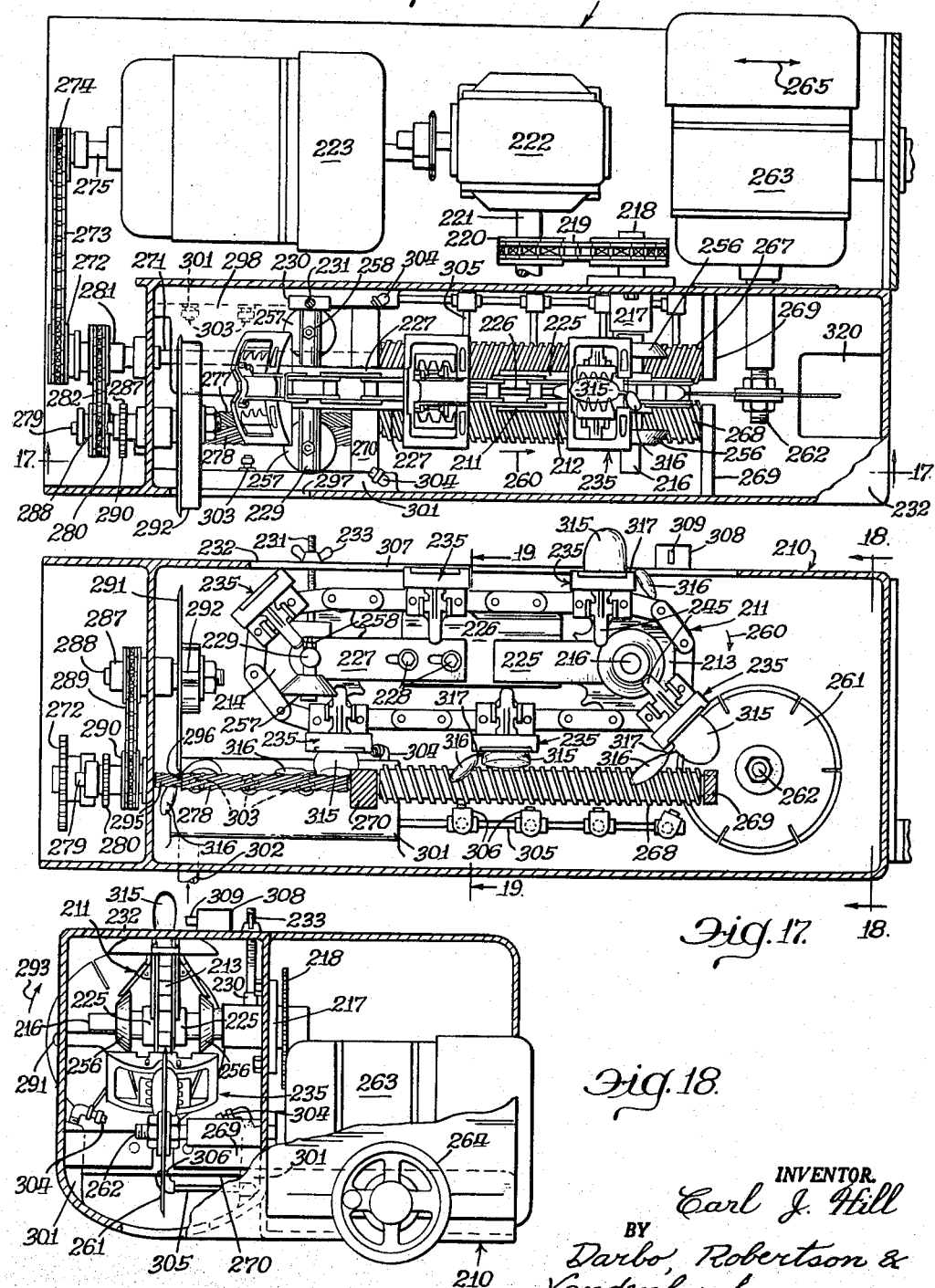
INVENTOR.
Carl J. Hill
BY
Darbo, Robertson &
Vandenburgh
ATTORNEYS INVENTOR.
Carl J. Hill
BY
Darbo, Robertson &
Vandenburgh
ATTORNEYS March 9, 1965 C. J. HILL 3,172,148
POULTRY GIZZARD PROCESSING APPARATUS
Filed Oct. 30, 1963 9 Sheets-Sheet 9

INVENTOR
Carl J. Hill
BY
Darbo, Robertson &
Vandenburgh ATTORNEYS

United States Patent Office 3,172,148
Patented Mar. 9, 1965

3,172,148
POULTRY GIZZARD PROCESSING APPARATUS
Carl J. Hill, Box 409, Canton, Ga.
Filed Oct. 30, 1963, Ser. No. 320,221
58 Claims. (Cl. 17—11)

The present application is a continuation-in-part of my prior application Serial No. 164,759, filed January 8, 1962, now abandoned, and a continuation-in-part of my application Serial No. 298,521, filed July 22, 1963; the latter of which was a continuation-in-part of application Serial No. 190,166, filed April 25, 1962.

The present invention relates to improvements in the apparatus for processing poultry gizzards, and the following disclosure is offered for public dissemination upon the grant of a patent therefor.

In the past decade machines have been developed to partially eliminate the hand labor problems previously involved in the preparation of poultry gizzards for market. Initially, a machine was devised for "peeling" poultry gizzards, i.e. removing the membrane lining the interior of the gizzard. The availability of this machine soon lead to the development of machines for slitting the gizzard open and washing the contents from the interior of the gizzard. These machines have marked substantial strides forward in the art and have reduced the extent of the hand labor involved in removing a gizzard from the carcass and preparing it for marketing. At the same time, there remains a necessity for the utilization of a significant amount of hand labor in ordinary commercial practices. Insofar as I am aware, all of the available machines require a hand loading operation.

In the general commercial practices the gizzard is detached from the stomach, either concurrently with or following the removal of the gizzard from the carcass. Thereafter, the gizzard is transported to the slitting and washing machine, which opens the gizzard and prepares it for the peeling operation. From the slitting and washing machine the gizzard is transported to a peeling machine. At the peeling machine the gizzard is moved back and forth across the peeling rolls to detach the membrane lining from the exposed interior of the gizzard.

One of the principal reasons that has necessitated the hand loading of the machines for slitting and washing the gizzards is that the orientation of the slit made through the gizzard to open it for washing and peeling preferably is made in a particular orientation with respect to the gizzard. In general the shape of the internal pocket is not regular. That is, in the main the gizzard pocket has relatvely large dimensions along two of its axes and a relatively small dimension along a third axis. Preferably, the cut made in opening the gizzard is made transversely to the smallest axis. To load the gizzards into a conventional machine requires human judgment to position the gizzard in the machine so that the slit to open the gizzard will be cut normal to this smallest axis of the pocket.

It is a principal object of the apparatus that I have devised to achieve an orientation of the gizzard to permit the gizzard to be loaded into machines without the necessity of utilizing the human senses to achieve the desired orientation of the gizzard in the holders. While my invention may be employed in the manual loading of gizzards into conventional processing equipment, its greatest advantage is achieved in enabling the gizzards to be loaded by automatic machinery without the necessity of using hand labor. To the extent that hand labor is eliminated, a substantial saving in processing costs can be achieved.

A further principal object of my invention is to detach the gizzard from the poultry carcass in a manner in which an initial orientation is achieved from the position of the stomach with respect to the gizzard at the carcass. The initial orientation enables the apparatus to deliver the two to the slitter and washer in a particular orientation. The method is such that I have been successful in devising apparatus in which the automatic procesisng commences with the detachment step. Thereafter the gizzard is moved to the slitter and washer in a predetermined orientation and loaded into that machine in a position such that the gizzard is properly oriented with respect to the cut that will be made through it by the machine. I have devised equipment which automatically will carry out the steps of detaching the gizzard from the carcass, conveying it to the slitter and washer and loading it into the slitter and washer in the required orientation.

I have devised a novel apparatus which detaches the gizzards with the stomachs attached from partially eviscerated carcasses and ultimately delivers cleaned and washed poultry gizzards to a discharge station with the lining removed from each gizzard and the stomach detached therefrom. All this is achieved without human intervention. The obvious result is substantial economy over present practices wherein manual labor is involved in the sequence of steps that are required to achieve the same result from the same starting point.

An important factor in achieving the overall result of my invention is the apparatus I have devised for cleaning and washing the gizzards. In some embodiments, as hereinbefore mentioned, the presence of the stomach is employed to properly align the gizzard for cutting. I have also devised apparatus in which the presence of the stomach is utilized to properly position the gizzard on the lining removal part of the machine for quickly commencing the effective detachment of the lining from the gizzard.

The apparatus of my invention is relatively simple thus resulting in relatively nominal capital investment and maintenance costs. The required plant servicing is not complicated and does not require the presence of a specially skilled mechanic.

While my invention can be employed with the greatest economic benefit if the gizzards are mechanically detached during the eviscerating process and automatically loaded into the apparatus for splitting and washing them, this is not to say that embodiments disclosed herein are not economically beneficial even when hand loaded (after either manual or mechanical detachment). Using the best commercially available equipment it requires a minimum of about three people to process approximately 1200 gizzards an hour. In contrast one person can process approximately 1000 gizzards per hour, utilizing the embodiment of FIGURES 16–22 (and performing the detachment manually). It is anticipated that even greater production rates are attainable.

This one person can remove gizzards from carcasses moving along a processing line and load them into the machine. Utilizing embodiments of my invention which incorporate means for automatically separating the gizzard and the stomach, these two can be detached from a carcass at one time. Since the machine will perform the separating operation, the one operator need not exercise the care in their removal that otherwise might be required were the gizzard to be cut from the stomach at the time the gizzard was removed from the carcass. After removing the gizzard from the carcass, it is positioned in a holder in the machine. This holder has a trigger which causes the gizzard to be gripped by the machine as soon as it is placed in the holder. Thereafter, the machine takes over and automatically performs all of the remaining processing steps. The machine delivers a split, cleaned and peeled gizzard at a discharge chute or receptacle. In the meantime, the operator is continuing to detach gizzards (with or without the stomachs attached) from carcasses and loading them into the machine.

The foregoing is deemed by me to be a preferred application of my invention. However, some poultry processors may prefer to have one operator do nothing but remove the gizzards from the carcasses and supply the gizzards to a member of other operators who are loading them into separate machines. This does not detract from the fact however, that there is an obvious monetary saving to the processor by reason of the reduction in the present number of hand operations that are required in connection with the machines commercially available.

A further advantage of my invention is that there is a monetary savings involved merely in the reduction of the number of machines that are required. Instead of investing in a slitting and washing machine in addition to the peeling machine, all which their separate motors, controls, etc., a plant need only purchase a single machine. Less flour space is required for the one machine. In addition, containers, receptacles or conveyors are not required to receive the split and washed gizzards and transport them to the peeling station. This is a reduction in floor space as well as in investment. To the extent that floor space is reduced, the investment in a building proportionately can be utilized more effectively. A further significant factor, with respect to space requirements, is that embodiments of my invention are extremely compact. As a rule the complete processing machine of my invention occupies less space than does only a slitter and washer machine of the type presently being used commercially. Thus, less space is required for the single machine performing the complete job than has been required for one of the two machines presently used for the same complete job (without considering the holding containers, etc.).

While the overall reduction in the amount of hand labor is, in a large measure, attributable to the fact that there is but a single machine which only must be loaded once, this is not the whole answer to the labor saving achieved. Another factor, already mentioned, is that embodiments may be made to accept gizzards with the stomachs attached and to automatically separate the gizzard from the stomach. A further factor lies in the particular gizzard holders that I have devised.

The gizzard holders perform exceptionally well insofar as their basic function of grasping the gizzard and holding it securely in proper position for processing is concerned. However, the holders have a further important characteristic. The holders include a trigger, which, when actuated by pushing the gizzard into the holder, releases a pair of grippers to properly and securely hold the gizzard. The grippers and trigger are automatically cocked before the holder is presented at a loading station. At the loading station the operator can insert the gizzard into the holder, almost without looking at the machine and the machine takes over from there. The operator then can immediately let go of the gizzard and move back to the separation of another gizzard from a carcass, etc.

Other factors that materially affect the desirable overall operation and contribute to the ability to incorporate the complete processing in a single machine include: the peeling rolls I have devised not only do an effective job for that purpose, but in addition serve as a part of a conveying means and assist in the overall movement of the gizzards through the machine; the cleaning rolls serve the double function of opening the split gizzards and frictionally scraping at least part of the inner walls of the gizzard; and adjustments are provided which permit the processor to set the machines for effective processing of gizzards of average size or to accommodate a run of exceptionally large or exceptionally small gizzards.

Further objects and advantages will be apparent from the following description taken in conjunction with the drawings in which:

FIGURE 2 is a partial elevation as viewed at line 2—2 of FIGURE 1;

FIGURE 3 is a partial elevation as viewed in FIGURE 1 showing the transfer chute in an alternate position;

FIGURE 4 is an enlarged section through the worm and cutter for the gut as seen at line 4—4 of FIGURE 2;

FIGURE 5 is a partial plan view showing the portion of the apparatus for receiving and grasping the detached gizzards;

FIGURE 6 is a sectional elevational view of the apparatus of FIGURE 5;

FIGURE 7 is an enlarged partial section as viewed at line 7—7 of FIGURE 6;

FIGURE 8 is a partial section as viewed at line 8—8 of FIGURE 7;

FIGURE 9 is a partial plan view as viewed at line 9—9 of FIGURE 7;

FIGURE 10 is a partial section illustrating the gizzard holders and the gizzard slitting knife;

FIGURE 11 is an elevational view, partially in section and partially broken away, of an alternative form of cleaning and washing apparatus embodying a lining removal means;

FIGURE 12 is an enlarged section as seen at line 12—12 of FIGURE 11;

FIGURE 13 is a perspective view of the cutting knife and feeding means of the embodiment of FIGURE 11;

FIGURE 14 is a plan view, partially in section of the embodiment of FIGURE 11;

FIGURE 15 is an enlarged fragmentary plan view of the peeling means of FIGURE 11;

FIGURE 16 is a plan view of an embodiment of my invention with all but a small portion of the cover broken away;

FIGURE 17 is a section as viewed at line 17—17 of FIGURE 16;

FIGURE 18 is an end view with a portion broken away, the broken away portion being viewed approximately along the line 18—18 of FIGURE 17;

Figure 1:
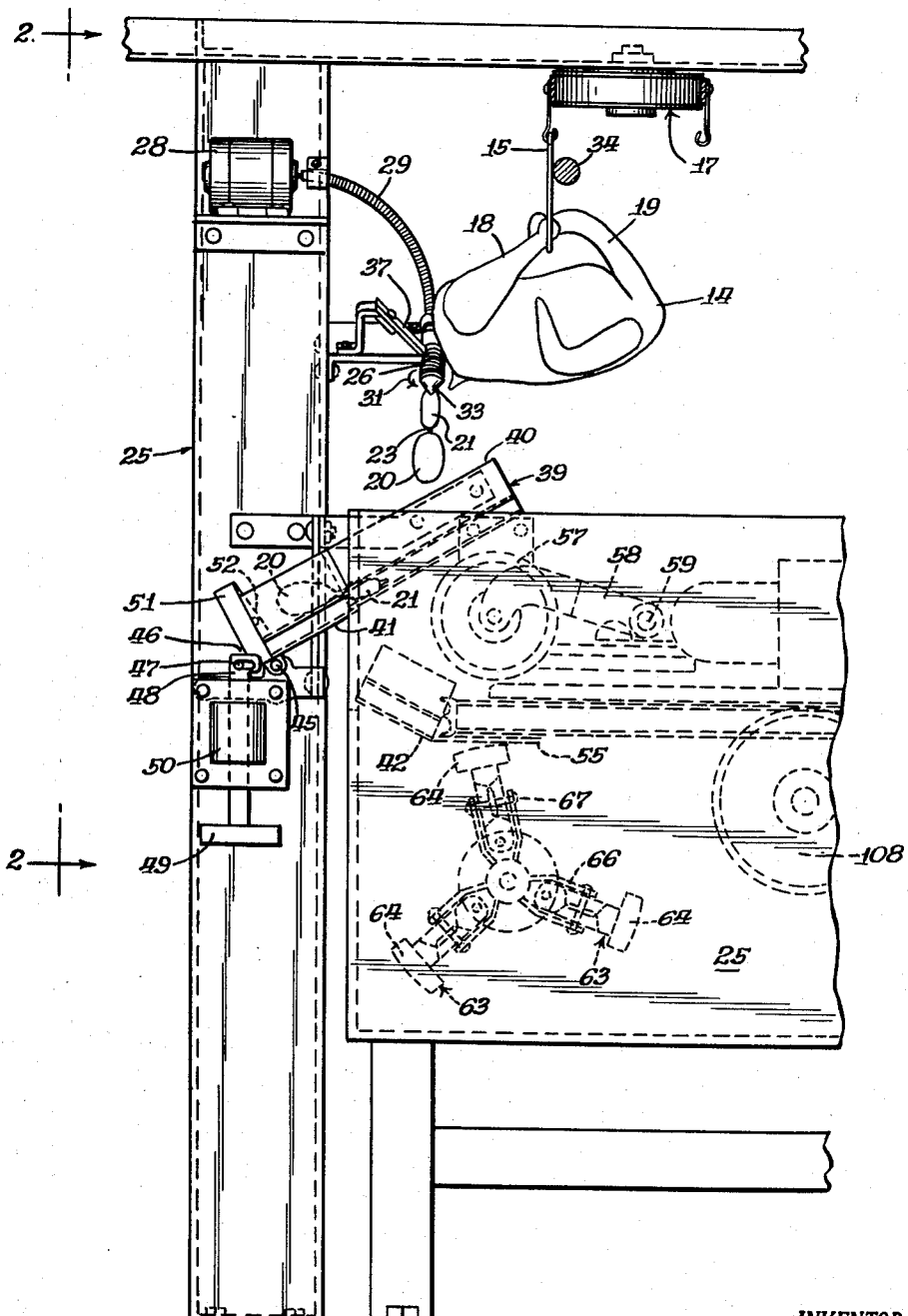
FIGURE 1 is an elevational view of an embodiment of my invention.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

In the method of my invention the gizzard is not separated from the stomach when the two are removed from the poultry carcass. This is contrary to the conventional commercial practices known to me. During the eviscerating process of the poultry carcass the intestine is cut from the gizzard and the gut (gullet) is cut from the stomach. After this operation is performed the gizzard and the stomach remain connected together by a small tube.

In actual practice the eviscerating will take place while the carcass still is hanging from a shackle moving along with an overhead conveyer. The shackle preferably is of the three-point suspension type. The evisceration is carried out to the point that the gizzard has been separated from the intestine and the intestine removed. The gizzard and stomach then are left in a positon such that they are hanging from the carcass cavity by the gut. At a given point along the path of movement of the carcass the shackle is aligned to facilitate cutting the gut and moving the gizzard and its attached stomach to the slitter and washer. After alignment, the gut is severed to release the stomach and gizzard. These two then are moved in a given sequence to the position at which the gizzard is to be received by the holders of the slitting machine. The portions, stomach and connecting tube, that remain attached to the gizzard are used to align the gizzard in the holders in a manner such that, as the gizzard holders move past the slitting knife, the gizzard will have the desired orientation for producing the proper line of cut through the gizzard. In one embodiment the portions attached to the gizzard are grasped and used to manipulate the gizzard into the desired position in the holders.

I have found that it facilitates the carrying out of my process if the gizzard and stomach are moved to the slitting machine along a path in a sequential order in which the stomach precedes the gizzard. The final positioning of the gizzard in the slitting machine is accomplished by an engagement of the attached portions and a movement of the gizzard directed by that engagement. The method I have devised may be practiced in a manner such that the stomach is detached from the gizzard after it has been utilized to position the gizzard in the slitter and also in a manner in which the stomach is retained in place until after it is employed to position the gizzard on the lining removal apparatus.

The drawings illustrate an embodiment of an apparatus for carrying out the method heretofore explained. As is conventional in the industry, the partially processed poultry 14 is carried by a shackle 15. The shackles are supported and moved in the direction indicated by arrow 16 by an overhead conveyer generally 17. The specific structure of the overhead conveyer 17 is unimportant to the present invention. Shackles 15 are of the three-point suspension type in which the legs 18 and the neck 19 of the poultry all are engaged in the shackle. The poultry already have been partially processed, including partial evisceration, and the gizzard 20 and the stomach 21 are hanging from the poultry 14 by the gut 22. The gizzard 20 and stomach 21 are connected by a small tube 23.

The apparatus embodying my invention includes a frame generally 25. A worm 26 is journaled in a bearing 27 mounted on frame 25. Worm 26 is rotated by a power means such as motor 28 connected to the worm through a flexible shaft 29 and a coupling 30. The worm is rotated in the direction indicated by arrow 31.

Worm 26 has an unsupported end defined by conical cap 33. The axis of the worm from the supported end, as defined by bearing 27, to the unsupported end extends generally in the reverse of the direction of movement of the poultry, indicated by arrow 16. In addition to extending generally in the reverse of the path of movement of the poultry, the worm extends slightly downwardly (from the supported to the unsupported end) to automatically adjust for poultry of different sizes. The poultry are aligned by means such as bar 34 which contacts shackle 15 (in conjunction with the alignment provided by the path of travel of the conveyer).

The worm is positioned so that cap 33 will pass between the carcass of the poultry and the stomach 21. Thus, gut 22 will become engaged in the helical opening 35 in worm 26. The rotation of the worm will move gut 22 in the same direction, i.e. the direction of arrow 16, that the poultry carcass is moving. Immediately adjacent the supported end of the worm the helical opening 35 terminates in a cutter 36 which has a cutting edge coincident with the periphery of worm 26. A fixed cutter blade 37 is mounted on frame 25 and has a cutter edge at the periphery of the worm and extending parallel to the axis of the worm. As the tube 22 reaches this portion of the worm it is clipped between the two cutters 36 and 37 as best illustrated in FIGURE 4.

The detached stomach and gizzard fall into a conveyer defined by a chute generally 39. Chute 39 has three portions, an upper fixed portion 40, a middle pivoted portion 41, and a lower fixed portion 42. Chute 39 has a pair of spaced ledges 43 at each side of a center groove 44. Ledges 43 are sufficiently close together so that a gizzard will be supported thereon. At the same time they are sufficiently far part so that the stomach will slide within groove 44.

Portion 41 of the chute is pivotally supported on frame 25 at 45. A lever arm 46 extends rearwardly of portion 41 and is connected by a pin 47 to a plunger 48. Plunger 48 is secured to an armature 49 of a solenoid 50. On portion 41 is an electrical switch 51 having a switch actuating member 52 facing upwardly in the chute (see FIGURE 1).

When the gizzard and stomach are detached from the carcass they initially fall into portion 40 of chute 39. At this time the gizzard 20 will be downwardly, ahead of the stomach 21, as they move down the chute. After they have slid approximately to the position indicated in FIGURE 1, gizzard 20 will contact actuating member 52 to actuate switch 51 and energize solenoid 50. Solenoid 50 will then pick up armature 49 moving it to the position illustrated in FIGURE 3. Plunger 48 will pivot portion 41 of the chute to the position illustrated in that figure. The gizzard and the stomach then will slide downwardly into portion 42 of the chute but at this time the stomach 21 will be ahead of the gizzard 20.

It will be apparent to those skilled in the art that a hydraulic or a pneumatic actuating means might be used to pivot portion 41 of the chute, rather than a solenoid and armature as illustrated. Timing means, not shown, will be employed to de-energize solenoid 50, a given period of time after it has been energized. The period of time selected will be sufficient time for the stomach and gizzard to have moved into the fixed portion 42 of the chute. When solenoid 50 is de-energized, the weight of armature 49 and plunger 48 will return the pivoted portion 41 of the chute to the position illustrated in FIGURE 1.

At the lower end of chute portion 42 is a generally horizontal plate 55 having a slot 56 extending the length thereof in line with groove 44 in the chute. Stomach 21, preceding gizzard 20 down the chute, will fall through slot 56. However, a stop defined by wheel 57 blocks the movement of gizzard 20. Wheel 57 is rotatably mounted on an arm 58. Arm 58 is secured to a shaft 59 suitably journaled in frame 25. A cam follower 60 is secured to shaft 59. A cam 61, upon which follower 60 rides, periodically pivots arm 58 a limited amount in a clockwise direction as viewed in FIGURES 1 and 6. Thus, at timed intervals stop wheel 57 is raised to permit gizzard 20 to continue on down chute portion 42 and onto plate 55. Subsequently stop wheel 57 again is lowered.

In a corresponding timed relationship one of the portions dangling from the gizzard, e.g. the stomach 21 and tube 23, is grasped by one of the grippers generally 63 and pulled to the right and downwardly as viewed in FIGURE 6. This aligns the gizzard in a predetermined position on plate 55 where the gizzard is grasped by holders as hereinafter described. With the gizzards supported on plate 55 and grasped by the holders, continued movement of gripper 63 applies sufficient tension to tube 23 to break the tube and separate the stomach 21 from the gizzard 20.

Grippers 63 are best illustrated in FIGURES 7–9. They are comprised of a pair of jaws 64 mounted on arms 65. Arms 65 are pivotally secured to brackets 66 by pins 67. Brackets 66 are secured to a hub 68 which in turn is affixed to a shaft 69. Shaft 69 is suitably journaled in frame 25. It is connected to a suitable power means to rotate grippers 63 in the direction indicated by arrow 70.

A pair of cams 73 are journaled on shaft 69 and are held in position by brackets 74 forming a part of frame 25. Captive balls 75 on the inner ends of arms 65 ride on the faces of cams 73 and serve as cam followers. Springs 76, the ends of which are received in recesses 77 in arm 65, urge balls 75 against the faces of the cams. At the same time, of course, springs 76 urge jaws 64 toward each other.

Cams 73 are shaped so that the jaws 64 of gripper 63 are open from about the five o'clock position to about the twelve o'clock position as viewed in FIGURE 6. From about the twelve o'clock position to about the five o'clock position the grippers are closed by the urging of springs 76. Thus as the uppermost gripper passes the dangling stomach 21 in FIGURE 6, the gripper is closed to grasp the stomach 21, the tube 23, or portions of both. After the stomach has been separated from the gizzard, it is dropped by the cam actuated opening of the gripper 63.

In the meantime the gizzard 20 will have been engaged by holders as hereinafter described. In the illustrated embodiment there are opposed pairs of holders 80 and 81, and 82 and 83. Holders 82 and 83 are secured to arms 84 attached to a roller chain 85. Chain 85 is supported by a pair of sprockets 86 and 87. Sprocket 86 is journaled on a stub shaft 88 on the outstanding end of mounting member 89. Sprocket 87 is secured to a driven shaft 90. Mounting member 89 is journaled on shaft 90. Holders 80 and 81 are similarly mounted on a chain, not shown. One of the sprockets for this second chain is secured to shaft 92. The other is on the outstanding end of mounting member 93 which also is journaled on shaft 92. Mounting members 89 and 93 are urged towards each other by a spring 94. They are caused to move in unison by the connection of links 95 and 96. One end of link 95 is pivotally connected to mounting member 89 and the other end is pivotally connected to one end of link 96. Link 96 is pivotally attached to frame 25 by a pin 97 at about the center of the link. The other end of link 96 has a slot 98, within which is received a pin 99 secured to mounting member 93.

A shaft 102 is journaled in frame 25 and is driven by the power means. It carries a pair of gears 103 which drive gears 104 secured to shafts 90 and 92 respectively. The direction of drive is such that holders 82 and 83 move in the direction indicated by arrow 105 while holders 80 and 81 move in the direction indicated by arrow 106. The pairs of holders separate as arms 84 move about the sprockets, while along the straight runs between the sprockets, the holders are in juxtaposition.

As best seen in FIGURE 6 the holders 80–83 move in a generally horizontal plane immediately above the top of plate 55. As the holders approach each other they grasp the gizzard approximately as illustrated in FIGURE 10. With gizzards of a normal size, the gizzard will be thicker than the free space between the opposed holders, e.g. holders 80 and 82. Mounting members 89 and 93 thereby will be pushed apart against the resistance of spring 94.

The gizzard so grasped is moved by the holders past a rotary slitting knife 108 secured to a shaft 109. Shaft 109 is suitably journaled in frame 25 and is connected to the power means to be rotated thereby.

A sprocket 111 is secured to shaft 102. Sprocket 111 drives a chain 112 in the direction indicated by arrow 113. An idler sprocket, not shown, supports the other end of chain 112. Between the two sprockets chain 112 rides on a guide plate 114. Guide plate 114 is secured to a pair of arms 115. A second pair of arms 116 supports guide plate 114 from the other shaft on which the opposite sprocket, not shown, is mounted. As best seen in FIGURE 6 chain 112 moves about sprocket 111 down over the top of the gizzards in the holders so that projections 118 on chain 112 contact the top of the gizzards. At about this stage holders 80–83 move apart sufficiently to release the slit gizzard. The gizzard is dropped on a pair of cleaning rolls 121 suitably journaled in frame 25. Rolls 121 are connected to the power means to be rotated in a direction such that the tops of the rolls are moving away from each other. This acts to spread the split gizzard which is moved along the cleaning rolls by projections 118 of chain 112.

FIGURES 11–15 illustrates an alternative form of a slitting and washing machine and one which includes a gizzard lining removal apparatus. In this embodiment the gizzard lining removing apparatus is unique in that the presence of the stomach, attached to the gizzard, is employed to properly position the gizzard with respect to the peeling rolls and to accurately and promptly initiate the peeling operation. The apparatus has the feature that after such positioning and aligning, the stomach is automatically detached from the gizzard. The gizzards to be processed are delivered to the embodiment of FIGURES 11–15 by the lower section 42 of the chute.

This embodiment includes a frame 125 on which is the conveyer 126. The conveyer 126 is defined by a chain 127 trained for movement about two sprockets 128 and 129. While in some embodiments chains 126 will provide sufficient engagement with the gizzard and stomach, I prefer to employ a plurality of projections 130 which extend up from the side links of the chain as an additional engaging means. Sprocket 128 is mounted on a shaft 131 suitably journaled in frame 125. Sprocket 129 is secured to a shaft 132 journaled in bearings 133 and 134 of frame 125.

A second sprocket 136 is secured to shaft 132 and is driven by a chain 137 from sprocket 138 on the output shaft 139 of a speed reducer 140. The input shaft 141 of the speed reducer has a pulley 142 secured thereto. Pulley 142 is driven by a belt 143 from a pulley 144 on shaft 145 of electric motor 146.

Motor 146 is secured to brackets 148 and 149 slidably mounted on posts 150 of frame 125. A screw 151 operated by hand wheel 152 and journaled in frame 125 is threadably engaged with bracket 149 to enable the operator to adjust the vertical position of motor 146 and thus knife 153. Knife 153 is secured to a shaft extension 154 which in turn is attached to motor shaft 145.

A feed trough 156 connects with lower chute 42. Like chute 42, trough 156 has a central groove 157 and side ledges 158. At each side of trough 156 are water pipes 159 which are open at the ends most adjacent conveyer 126. Pipes 159 are spaced sufficiently far apart so that the gizzards will pass freely therebetween. Pipes 159 are connected together by a pipe 160 which in turn connects with a suitable source of water supply, not shown. Also connected to pipe 160 is a pipe 161 which defines an opening 162 at the low end of groove 44 and directed down groove 157 of feed trough 156.

Immediately ahead of conveyer 126, as related to the direction of movement of the gizzards into the machine, is a hold-down or gate 164. Gate 164 has a pair of stub shafts 165 which are journaled in slots 166 of brackets 167 forming a part of frame 125. Gate 164 has a nose 168 that projects forward and is just slightly wider than groove 157. It will be apparent that gate 164, with its pivotal support at only one end, is urged downwardly by the weight thereof.

Saw 153 has a cutting edge 153a and a plurality of radial cutting notches 153b. Even though edge 153a may be relatively sharp in the initial stages of the operation of the machine, it will become dulled through use. This causes no difficulty however, since the major cutting function is performed at notches 153b. Knife 153 is rotated in the direction indicated by arrow 155.

Following the cutting by knife 153, the gizzards 20 are moved by conveyer 126 through a cleaning and washing zone. A hold-down bar 170 extends above and generally parallel to the top run of chain 127. It has a bifurcated nose 171 which extends about blade 153 and a curved tail piece 172 that substantially conforms to the curvature of chain 127 about sprocket 129. A pair of wings 173 are secured to bar 170 and extend outwardly and downwardly from a forward position thereof.

Bar 170 is affixed to the under side of spray pipe 175 supplied with water from a suitable source, not shown, through a supply pipe 176. Spray pipe 175 has a plurality of spray orifices 177 extending therealong and at opposite sides of bar 170. Pipe 175, and thus in turn bar 170, is supported from frame 125 by brackets 178 suitably secured to the frame and to spray pipe 175. Guide plates 180 are secured to frame 125 and are positioned at sprocket 129, at opposite sides of the sprocket and at opposite sides of chain 127.

The gizzard linear removal means is mounted at the end of conveyer 126 and comprises two helically ribbed peeling rolls 182 and 183 suitably journaled in frame 125. The helical ribs have a substantial pitch, approximately four times the external diameter of the rolls. Roll 182 has a shaft 183 which is connected by a coupling 184 to shaft 185 of electric motor 186. The interengagement of the helical ribs of the two rolls causes roll 182 to in turn drive roll 183. The rolls are rotated in a direction such that gizzards deposited thereon are moved by the helical ribs and the engagement with the rolls in the direction indicated by arrow 187 in FIGURE 14.

At the entering end of rolls 182 and 183, the external diameter of the ribs is reduced in size whereby the periphery of the ribs of the two rolls define a slot 188 therebetween. A pair of ribbed cleaning rolls 189 are suitably journaled in frame 125 and interengage the peeling rolls 182 and 183 at the entering end thereof. A cover plate 191 is positioned over peeling rolls 182 and 183 and has an opening 192 aligned with the line of interengagement between the two rolls. At the discharge end, opening 192 narrows to a small opening 193.

As previously described, the stomachs 21 come down chute 42 followed by the gizzards 20. At the end of the chute the water jets from opening 162 and from the openings in the ends of pipes 159 push the two along feed trough 156 to a position against gate 164 and into contact with saw or knife 153. Actually the stomach is permitted to move under the nose 168 of gate 164 through the opening provided between it and the bottom of groove 157.

The rotation of knife 153, as indicated at 155, in addition to partly severing the stomach, acts to pull the stomach in the direction indicated by arrow 195 in FIGURE 11. This is, of course, the same direction in which the upper run of chain 127 is moving. At about the same time the stomach is frictionally engaged by the chain and by projections 130 thereon. The combination of these pulling forces, plus the pushing forces provided by the rearward water jets, move the stomach in the direction indicated by arrow 195. The stomach in turn pulls the gizzard 20 under gate 164. The gate is swung upwardly as the gizzard 20 presses against it. However, the gate 164 serves to hold the gizzard down against the bottom walls of feed trough 156. The shape of the feed trough 156, and particularly that of groove 157 (seen in FIGURE 12), in conjunction with the configuration of gate 164, serves to hold the gizzard in the position with the ridge at one side of the gizzard in the bottom of the groove. The presence of the stomach and the pulling on the stomach as it moves into the knife is a further factor in achieving this alignment of the gizzard.

The stomach followed by the gizzard moves along the top run of conveyor 126 and under guide bar 171 and spray head 175. Wings 173 flatten out the two sides of the cut gizzard. Spray head 175, of course, washes out the inner pocket of the gizzard and removes the contents therefrom. As the stomach 21 and gizzard 20 move about the portion of the conveyor defined by sprocket 129, the stomach is lowered into the slot 188 between the two peeling rolls. Tail piece 172 of guide bar 170 and guide plates 180 ensure that the stomach is directed down into the slot. In addition, guide plates 180 ensure that the stomach and gizzard are disengaged from the conveyer 126.

The stomach passes through slot 188. The ribs on the peeling rolls engage the stomach and pull it downwardly. The gizzard is drawn against the top of the peeling rolls. At the same time the two are moved in the direction indicated by arrow 187. When the two reach the end 188a of the slot, the scissors action between the interengaging ribs of the rotating peeling rolls severs the tube 23 at the gizzard. This scissors action is particularly effective by reason of the fact that only one roll, i.e. roll 182, is directly power driven. In effect this roll is rotating ahead of roll 183 and the contact force necessary to in turn drive roll 183 provides the scissors action at the contact between the ribs of the two rolls. This action is distinctly different than it would be were both of the rolls 182 and 183 directly connected to motor 186. Rolls 182 and 183 drive the respective cleaning rolls 189. To the extent that the grooves between the helical ribs tend to fill up with material as a result of the pulling force on the stomach, these grooves are cleaned out by the interengagement with the cleaning rolls.

The pulling force on the stomach and particularly that applied at the instant that tube 23 is severed, properly positions the cut and clean gizzard on the peeling rolls for effective removal of the lining. As a matter of fact, as the tube is severed at end 188a of the slot, the gizzard is pulled into the interengaging helical ribs of the remaining part of the peeling rolls to effectively commence an engagement of the gizzard lining by the peeling rolls to achieve prompt and effective separation of the lining from the gizzard. The gizzard moves rapidly in the direction indicated by arrow 187. As it commences into the narrowed portion 193 of the opening 192, the gizzard is moved up onto the top of cover plate 191 which supports it against any substantial further contact with the peeling rolls. This configuration of the opening, which in conjunction with the action of the rolls moves the gizzard up onto the cover, prevents the occurrence of the turning over of the gizzard on the peeling rolls which has been a problem with prior art devices.

In the embodiment illustrated in FIGURES 16–22 there is a frame generally 210 on which is carried a conveyer generally 211. Conveyer 211 comprises a roller chain 212 trained for movement about sprockets 213 and 214. Sprocket 213 is secured to a shaft 216 journaled in a bearing 217 on frame 210. On the outboard end of shaft 216 is a sprocket 218 which is driven by a chain 219 from a sprocket 220. Sprocket 220 is on the output shaft 221 of a variable speed reducer 222. Speed reducer 222 is driven by a motor 223.

A pair of support arms 225 are journaled on shaft 216 at opposite sides of sprocket 213. To support arms 225 is secured an arm center plate 226 on which the rollers of chain 219 ride along the top run of the conveyer. A second pair of support arms 227 are adjustably secured to plate 226 by means of bolts 228. The outstanding ends of arms 227 are secured to shaft 229 on which sprocket 214 is journaled. A yoke 30 is secured to shaft 229. In turn, an adjustable support rod 231 is affixed to yoke 230. Support rod 231 is threaded and extends through an opening in top 232 of frame 210, which opening is somewhat larger than the rod. An adjusting wing nut 233 is threaded onto the top of rod 231.

From the foregoing description it will be apparent that the attitude of conveyer 211 may be varied. At one end the conveyer frame, including arms 225 and 227 and center plate 226, may be pivoted about shaft 216. The opposite end of the conveyer frame is supported by rod 231 which may be raised or lowered by adjusting wing nut 233.

Figure 19:
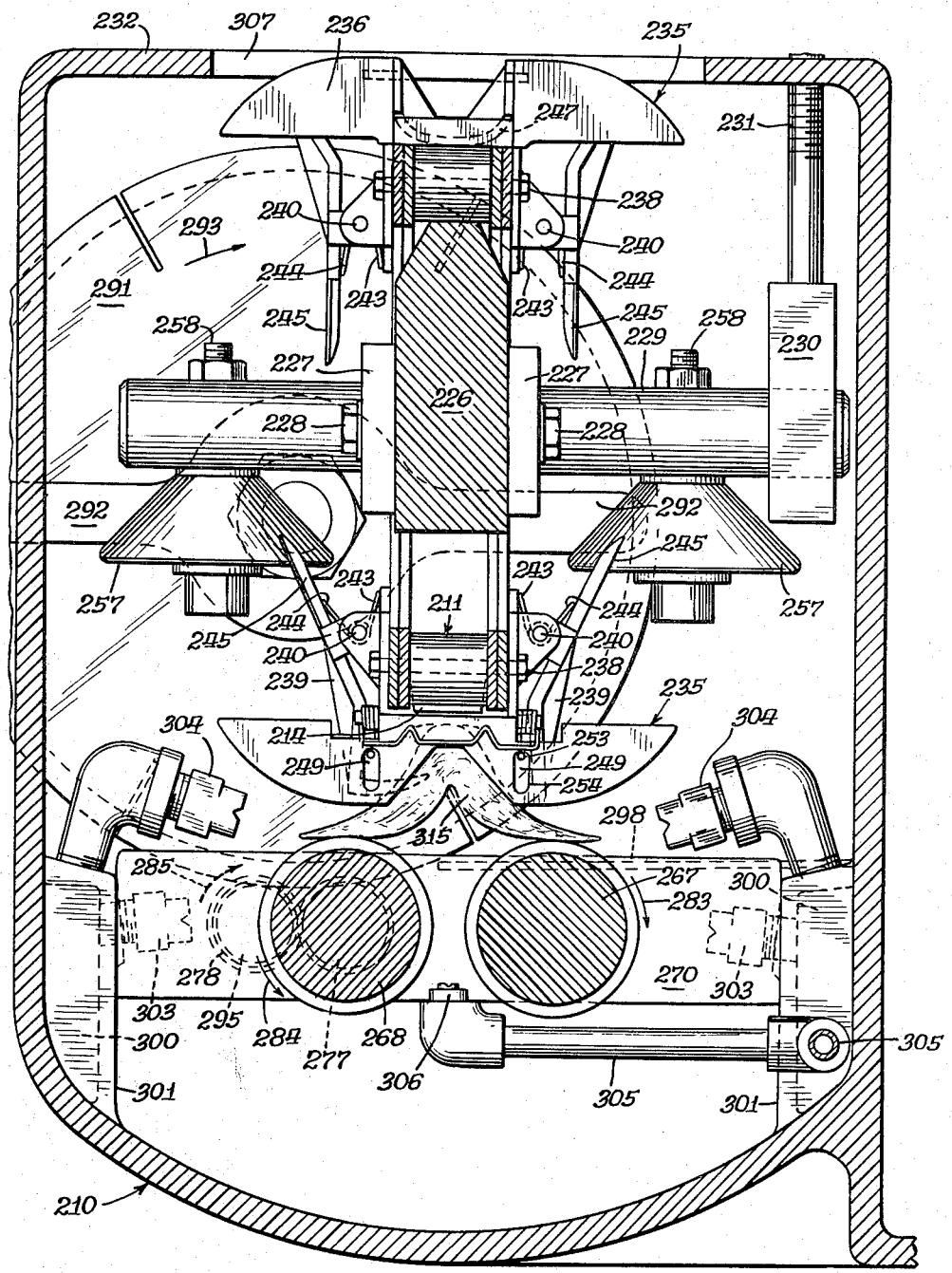
FIGURE 19 is an enlarged partial section as viewed at line 19—19 of FIGURE 17.
Figure 20:
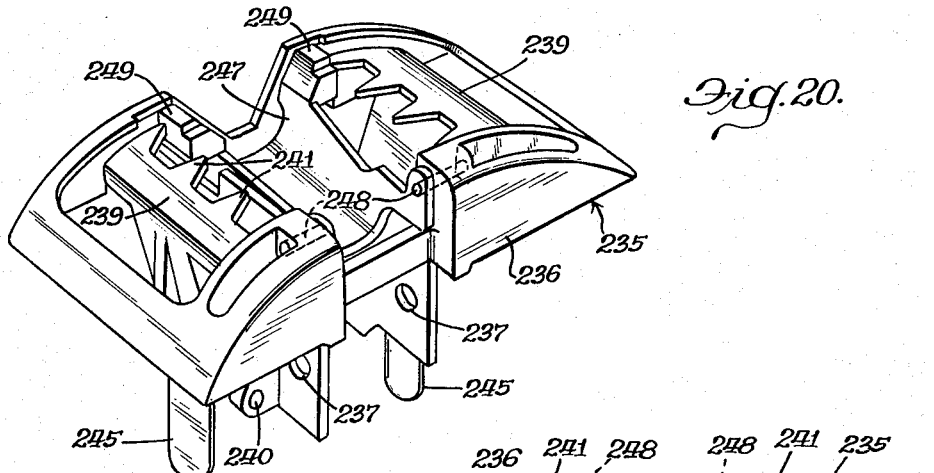
FIGURE 20 is a perspective view of a gizzard holder and its pair of toothed grippers.
Figure 21:
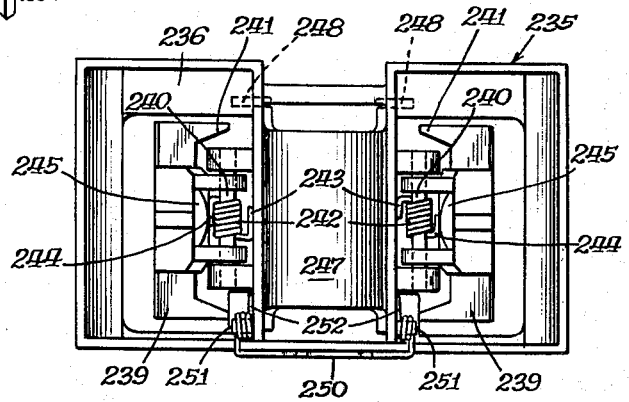
FIGURE 21 is a bottom view of the holder of FIGURE 20.

Secured to conveyer 211 are a plurality of gizzard holders generally 235. These are best illustrated in FIGURES 19, 20 and 21. In FIGURE 19 the lower of the two gizzard holders is illustrated in the position of gripping gizzards, i.e. after the grippers have been released by the trigger. In FIGURES 20–21 the gizzard holders are illustrated with the trigger and grippers in the cocked position.

Each of the gizzard holders 235 includes a frame 236 which has two pair of aligned openings 237 (FIGURE 20). The fasteners of the side plates and rollers of the roller chain, e.g. bolts 238, extend through openings 237 to attach frame 236 to conveyer 211. A pair of grippers 239 are pivotally attached to frame 236 by pins 240, respectively. Grippers 239 have teeth 241 projecting toward each other in spaced relationship. Coil springs 242 are mounted about pins 240 with one end 243 bearing against frame 236 and the other end 244 bearing against the extending arms 245 of grippers 239. The contact face 247a of the trigger is below teeth 241.

One end of a trigger 247 is hinged to frame 236 by means of pins 248. At the other end of the trigger are a pair of abutments 249 which, when the trigger is cocked are positioned in front of an end tooth 241 on each of grippers 239 respectively (FIGURES 20 and 21). A spring 250 is mounted on two pins 251 of frame 236. The two outstanding ends 252 of the spring bear against the bottom sides of the two abutments 249 (FIGURE 21) and urge the trigger 247 to its cocked position. On the ends of each of abutments 249 are pins 253 which extend through slots 254 in frame 236. The pins, in cooperation with the slots 254, serve to limit the pivotal movement of trigger 247.

Affixed to shaft 216 are a pair of truncated conical cams 256 (FIGURES 16 and 18). A pair of truncated conical cams 257 are rotatably mounted on bolts 258 (FIGURES 17 and 19). Bolts 258 in turn are fastened to shaft 229. As will hereinafter be described, cams 256 serve to force the teeth of the grippers into the gizzard to ensure that the gizzard is securely held by the grippers. Cams 257, on the other hand, serve to open the grippers and result in a recocking of the trigger.

Motor 223 drives conveyor 211 so that it moves in the direction indicated by arrow 260. Thus, as viewed in FIGURE 17, the holders 235 move across the top run of the conveyer from left to right, downwardly at the right end of the conveyer, and from right to left across the bottom run of the conveyer. Positioned so as to intersect the gizzards just as they enter the bottom run of the conveyer is a circular cutter 261, e.g. a slotted knife blade. Cutter 261 is affixed to the shaft 262 of a motor 263. While two motors, 223 and 263, are employed in the illustrated embodiment, it will be readily apparent to those skilled in the art that a single motor would suffice in many embodiments. Motor 263 is mounted on a movable base (not shown) with its position being adjustable by means of a hand wheel 264 (FIGURE 18) to permit it to be shifted back and forth as indicated by the arrow 265 (FIGURE 16). This permits the user to adjust the depth of cut of blade 261 with respect to the base of the gizzard, whose position will be fixed by trigger 247 of the gizzard holder, when the gizzard is inserted in the holder.

Extending below the bottom run of conveyer 211 and approximately parallel thereto are a pair of cleaning rolls 267 and 268. At one end rolls 267 and 268 are journaled in arms 269 of frame 210. At the other end they are journaled in cross bar 270. Roll 267 is affixed to a shaft 271 (FIGURE 16). A sprocket 272 on shaft 271 is driven by a chain 273. In turn, chain 273 is driven by a sprocket 274 mounted on shaft 275 of motor 223.

A pair of peeling rolls 277 and 278 are journaled in cross bar 270 at one end and in suitable bearings (not shown) on frame 210 at the other. Peeling roll 277 is connected to cleaning roll 268. Peeling roll 278 is attached to a shaft 279 on which is affixed a sprocket 280. A sprocket 281 on shaft 271 drives chain 282 which in turn drives sprocket 280. Peeling rolls 277 and 278 are in the form of helical gears having a very substantial pitch. For example, in one embodiment in which the peeling rolls are approximately 7/8″ in external diameter, the pitch is approximately 3½″. In any event, the pitch should be greater than twice the external diameter. The peeling rolls will function as helical gears and the driving of one peeling roll, e.g. 278, in turn causes rotation of the other peeling roll 277. Since peeling roll 277 and cleaning roll 268 are attached together the two rotate in unison. Cleaning rolls 267 and 268 rotate in the direction indicated by arrows 283 and 284 respectively in FIGURE 19. The rotation of peeling roll 277 also is indicated by arrow 284. Peeling roll 278 rotates in the direction indicated by arrow 285.

A sprocket 287 is affixed to a shaft 288. The sprocket 287 is driven by a chain 289 from a sprocket 290 on shaft 279. Shaft 288 carries a circular cutter 291, e.g. a slotted knife blade, as well as a two-arm rubber knocker 292. Cutter 291 and knocker 292 rotate in the direction indicated by arrow 293 (FIGURE 19).

Figure 22:
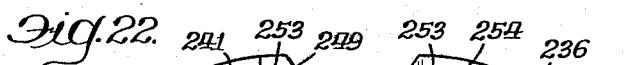
FIGURE 22 is an end elevation of the gripper of FIGURE 20 with a portion of the end broken away.
Figure 23:
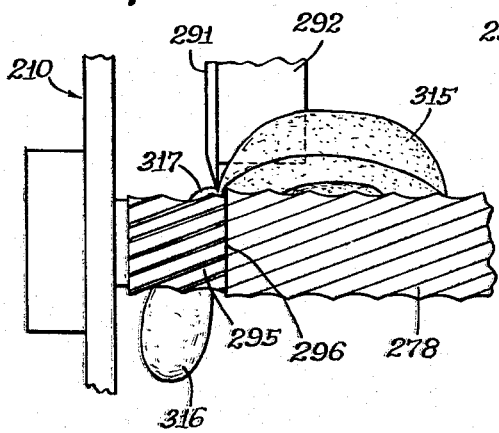
FIGURE 23 is a fragmentary elevational view of the end of the peeling rolls illustrating the structure for pulling the stomach and severing the tube connecting the stomach and the gizzard.

Referring particularly to FIGURE 22, it will be seen that at the left end of peeling roll 278 is a portion 295 of reduced diameter. The same construction is found in peeling roll 277. For example, in one embodiment, in which the main portion of peeling rolls 277 and 278 have an external diameter of 7/8″, the external diameter of the end portion 295 is 13/16″. The cutting edge of blade 291 extends immediately adjacent the periphery of the end portions 295 and in juxtaposition to the shoulder 296 which defines the line of demarcation between the main part of the peeling roll and the reduced diameter end thereof. Cutter 291 and knocker 292 extend through a discharge opening 297 (FIGURE 16) in the wall of frame 210. Within the frame opposite discharge opening 297 is a platform 298.

Suitable means are provided for washing the gizzards and for flushing the various parts of the machine. In the illustrated embodiment there are water passages 300 in casings 301 along portions of each side of the machine. Passages 300 are connected to a suitable source of water as by means of pipe 302 (FIGURE 17). Passages 300 feed a plurality of spray heads 303. At each side is a top spray head 304. A pipe 305, communicating with water passages 300, feeds a plurality of spray heads 306 under cleaning rolls 267 and 268.

Cover 232 extends over all of the top of the machine, except for an opening 307 through which the gizzards are inserted during the loading of the machine. On cover 232 is a safety switch 308 having an actuator 309. Safety switch 308 and its actuator 309 are positioned so as not to impede the loading of the machine, yet at a point at which it is readily accessible to the operator should the operator inadvertently become caught in one of the holders 235. In that event, a pressure on actuator 309 will stop the entire machine.

In the following description it will be assumed that the gizzards 315 have not been separated from the stomach 316, but still remain connected by the tube 317. Of course, if the tube has been severed from the gizzard to separate the stomach and the gizzard, the operation of the machine will be identical to that described, except for the omission of the final step performed by the machine in severing the tube connecting the stomach and the gizzard.

As the holders 235 rise about the left hand end of the run of the conveyer, as viewed in FIGURES 16 and 17, the trigger and grippers are in the cocked condition illustrated in FIGURES 20 and 21. An operator grasps a gizzard by the top with the stomach tube 317 at the bottom and the stomach 316 forwardly (as related to the direction of movement 260 of the holders). The gizzard is then pressed down into the holder and against contact face 247a. The pressure of the gizzard on trigger 247 pivots it downwardly so that abutments 249 no longer hold teeth 241 of the grippers 239 in the cocked position. With the grippers thus free to move, springs 242 pivot the two grippers 239 so that the teeth 241 thereof approach each other. Teeth 241 become sufficiently imbedded in gizzard 315 to hold the gizzard in place. With the pivotal movement just described, arms 245 of the grippers move apart from the positions illustrated at the top of FIGURE 19 and in FIGURE 20.

As the conveyer 211 moves the holder with the gizzard toward the right along the top run of the conveyer, the lower inner sides of arms 245 come into contact with the outer periphery of cams 256. The holder 235 at the top right in FIGURES 16 and 17 is just coming into the position at which the arms contact the cams. Cams 256 insure that arms 245 have been moved apart a predetermined amount and thus, that teeth 241 of the grippers are sufficiently imbedded in the gizzard to securely hold the gizzard during the processing operation.

As the holder moves down past cutter 261 a cut is made through the gizzard. As in conventional practices, it usually is desirable not to completely sever the gizzard into two pieces, but to cut completely through the gizzard pocket from one side, leaving the remaining portion of the gizzard uncut. A gizzard in the process of being cut is illustrated at the bottom right in FIGURE 17.

The two cleaning rolls 267 and 268 are rotating in a manner such that their upper surfaces are moving away from each other, see arrows 283 and 284 in FIGURE 19. Thus, the frictional contact between the cleaning rolls and the two sides of the gizzard, cause the sides of the gizzard to be moved apart, approximately as illustrated in FIGURE 19. This, of course, permits the emptying of the contents of the inner pocket of the gizzard. Spray heads 306 facilitate the emptying. When the angle of pitch of the cleaning roll (as illustrated in FIGURES 16 and 17) is compared with the direction of rotation of the rolls (as illustrated in FIGURE 19), it will be seen that the ribs of the cleaning rolls serve to rub backwardly on the split gizzard, that is, in the reverse of the direction of movement 260 of the holders 235 along the bottom run of the conveyer. This facilitates a thorough cleaning of the gizzard. At this time, the stomach 316 is hanging loosely ahead of the gizzard being cleaned. In the usual case, the stomach will have been moved to the outside of one or the other of the two cleaning rolls 267 and 268 by reason of the rotation thereof.

As the cleaned gizzard reaches the beginning of the peeling rolls 277 and 278 (the beginning being that portion of those rolls at the right in FIGURE 17) the gizzard is dropped at least partially onto the cleaning rolls. In the illustrated embodiment, as will be seen in FIGURE 19, only one side of the gizzard falls onto the cleaning rolls with the remainder of the gizzard being supported on plate 298. The dropping of the gizzard is accomplished by reason of arms 245 of the grippers passing between the two cams 257. The holder 235 at the bottom left of FIGURE 17 is just commencing to reach the position at which the gizzard is released.

As the holder 235 moves between the two cams 257, the cams press inwardly on each of the two arms 245 withdrawing teeth 241 from the gizzard. The gizzard is then free to fall by gravity. As the gizzard is released, spring 250 moves trigger 247 to the FIGURE 20 position at which the abutments 249 hold the two grippers 239 in the cocked position. Thus, as the holder 235 leaves cams 257 and commences moving upwardly at the left hand of the run, the trigger and grippers are cocked ready to receive another gizzard.

The gizzard that was dropped onto the peeling rolls is moved fully onto those rolls by the rotation thereof. At the same time, the teeth of the peeling rolls have sufficient pitch to move the gizzard toward the discharge end thereof, i.e. from right to left in FIGURE 17. By the time that the gizzard reaches the left end of the peeling rolls, the membrane lining of the pocket of the gizzard will have been removed.

Again, the stomach precedes the gizzard down the peeling rolls. While the stomach is relatively flat and thin, it is sufficiently large so that it cannot be drawn between the rolls, but rides in the V defined by the surfaces of the rolls. When the stomach reaches the discharge end of the peeling rolls it slips between cutter 291 and the abutment 296, and onto the end portion 295 of the peeling rolls. The smaller diameter of end portion 295 permits the stomach to pass between the two rolls. However, the end portions 295 of the two rolls will frictionally engage the stomach 316 and pull it downwardly. The downward pull draws the tube 317 taut when the processed gizzard comes into contact with the face of cutter 291. This results in tube 317 being drawn into a position at which it will be severed by cutter 291. Further rotation of the shaft, on which cutter 291 is mounted, brings one of the arms of knocker 292 into contact with the gizzard 315. This results in a gizzard being forcibly ejected from the peeling rolls and out through opening 297 in the wall of the frame 210. The stomach, along with the contents of the gizzard, etc., will be flushed out drain opening 320 in the opposite end of the casing.

I claim:

1. An apparatus for use in the processing of poultry moving along a given path with the gizzards and stomachs hanging from the poultry by the gut, said apparatus including: means at a point along the path to intercept the gut and sever the gut; conveyer means positioned to receive the detached gizzard and stomach and to deposit the two at a given position with the gizzard having a given orientation with respect to the stomach; means at said position to engage the oriented gizzard; and means associated with respect to the engaging means to cut the gizzard along a given plane with respect to the oriented gizzard.

2. An apparatus as set forth in claim 1, including means to detach the stomach from the gizzard after the gizzard has been oriented.

3. An apparatus for use in the processing of poultry moving along a given path with the gizzards and stomachs hanging from the poultry by the gut, said apparatus including: a gizzard slitting means comprising a gizzard engaging device and a cuting device, one of said devices being movable with respect to the other to cut a gizzard along a plane having a predetermined position with respect to the engaging device; and feeding means for detaching the gizzards from the poultry and delivering them to the engaging device in a given orientation to be engaged thereby in said orientation with respect to said position.

4. An apparatus as set forth in claim 3, wherein said feeding means includes a rotating worm means positioned along said path at an elevation to intercept the gut between the poultry carcass and the gizzard; a cutter associated with the worm means to sever the gut and release the gizzard; and conveyer means positioned to receive the released gizzard and to deliver it to the engaging device in said given orientation.

5. An apparatus for use in the processing of poultry moving along a given path with the gizzards and stomachs hanging from the poultry by the gut, said apparatus including: a gizzard slitting means comprising a gizzard engaging device and a cutting device, one of said devices being movable with respect to the other to cut a gizzard along a plane having a predetermined position with respect to the engaging device; and a feeding means for detaching the gizzards from the poultry and delivering them to the engaging device in a given orientation to be held thereby in said orientation with respect to said position, said feeding means including a rotatable worm means positioned generally parallel to said path and at an elevation and position to intercept the gut with the carcass on one side of the worm and the stomach on the opposite side, power means connected to the worm means to rotate the latter in a direction such that the gut is conveyed in said direction, a knife blade having a cutting edge along said worm means adjacent the one end thereof and between the support for the worm means and the other end, whereby the worm means will move the gut into the edge to sever the gut and release the stomach and gizzard, a chute means below the worm means at the knife to receive and convey the released stomach and gizzard along a given path with one of the two preceding the other along the chute means.

6. An apparatus as set forth in claim 5, wherein the chute means includes two portions, a first of the portions being immediately below the worm means to first receive the gizzard and stomach and to convey them downwardly with the gizzard preceding the stomach, a subsequent portion being pivotably mounted on the frame for movement between two positions, in one of which positions the subsequent portion is aligned with the first portion to receive first the gizzard and then the stomach, and pivotable to a second position in which the slope of the subsequent portion is reversed with the stomach leaving the subsequent portion ahead of the gizzard.

7. An apparatus as set forth in claim 6, including a power means connected to the subsequent portion to pivot it between the two positions, said subsequent portion normally being in the one position, and an actuating means connected to the power means and positioned to be actuated when a gizzard and stomach are on said subsequent portion to move the subsequent portion to the second position.

8. An apparatus for use in the processing of poultry moving along a given path with the gizzards and stomachs hanging from the poultry by the gut, said apparatus including: means for detaching and orientating the gizzard and including a rotating worm means positioned along said path at an elevation to intercept the gut between the poultry carcass and the gizzard; a cutter associated with the worm to sever the gut and release the gizzard; and conveyer means positioned to receive the released gizzard.

9. An apparatus as set forth in claim 8, wherein the conveyer means includes chute means below the cuttter to receive and convey the released stomach and gizzard along a given path with one of the two preceding the other along the chute means, said chute means including two portions, a first of said portions being immediately below the cutter to first receive the gizzard and stomach and to convey them downwardly with the gizzard preceding the stomach, a subsequent portion being pivotably mounted on the frame for movement between two positions, one of which positions the subsequent portion is aligned with the first portion to receive first the gizzard and then the stomach, and pivotable to a second position in which the slope of the subsequent portion is reversed with the stomach leaving the subsequent portion ahead of the gizzard.

10. An apparatus as set forth in claim 9, including a power means connected to the subsequent portion to pivot it between the two position, said subsequent portion normally being in the one position, and an actuating means connected to the power means and positioned to be actuated when a gizzard and stomach are on said subsequent portion to move the subsequent portion to the second position.

11. An apparatus as set forth in claim 8, wherein said form means is positioned generally parallel to said path and at an elevation and position to intercept the gut with the carcass on one side of the worm means and the stomach on the opposite side, power means connected to the worm means to rotate the latter in a direction such that the gut is conveyed in said direction, said cutter includes a knife blade having a cutting edge along said worm means adjacent the one end thereof and between the support for the worm means and the other end, whereby the worm will move the gut into the edge to sever the gut and release the stomach and gizzard.

12. An apparatus for use in the processing of poultry gizzards with the stomachs attached, said apparatus including: a gizzard slitting means including a conveyer means with a gizzard engaging device to engage a gizzard at a given position and to move the gizzard along a path, and a cutter positioned along said path to at least partially sever the gizzard; a feeding means to deliver a gizzard with the stomach attached to said position with a given orientation, whereby the gizzard will be engaged by said device with said orientation with respect to the cutter; and means to thereafter detach the stomach from the gizzard.

13. An apparatus for use in the processing of poultry gizzards with portions including the stomachs attached, said apparatus including: a chute means to hold a gizzard rearwardly of the stomach when they are deposited on the chute means in that sequence, said chute means having a discharge end; movable means at said end to stop the gizzard at said end while permitting the stomach to hang from the gizzard at said end; conveyer means having gizzard holding means movable adjacent said end with the holding means thereafter moving along a path; means at said discharge end to grasp a portion depending from the gizzard and to move the gizzard to a position to be held by said holding means and to orient the gizzard in the holding means; and a cutter along said path to cut the gizzards moved by the holding means.

14. An apparatus for use in the processing of poultry gizzards with portions including the stomachs attached, said apparatus including: a gizzard processing means including a conveyer means, a gizzard engaging device attached to said conveyer means to engage a gizzard at a given position and to move the gizzard along a path; a chute downwardly inclined to a discharge end, said end being adjacent said position, said chute having a trough in the bottom thereof which is larger than the cross-sectional size of the stomach and smaller than the cross-sectional size of the gizzard whereby the stomach will slide in the trough and the gizzard will slide on the top of the trough and a predetermined sequential order of the two in the chute will be maintained; and means to deliver the gizzard and stomach to the chute in a predetermined sequential order with respect to the length of the chute.

15. An apparatus as set forth in claim 3, and including gizzard lining removal means, said lining removal means being positioned to receive the gizzards after the same are cut and before the stomachs are detached therefrom, said removal means being adapted to utilize the stomachs to align the gizzards with respect to the removal means.

16. An apparatus as set forth in claim 15, wherein said removal means includes means to detach the stomach from the gizzard after the gizzard has been positioned on the removal means.

17. An apparatus as set forth in claim 16, wherein said removal means includes a pair of rolls having interengaging helical ribs, power means operatively connected to said rolls to rotate said rolls in a direction such that gizzards deposited thereon are moved by the rolls toward one end thereof, said rolls defining a narrow slot therebetween adjacent the other ends of the rolls, said slot being sufficiently large to receive a stomach and small enough to prevent the passage of a gizzard therethrough, said engaging device being positioned with respect to the rolls to introduce the stomach into said slot before depositing the gizzard on the rolls.

18. An apparatus for use in the processing of poultry moving along a given path with the gizzards and stomachs hanging from the poultry by the gut, said apparatus including: gizzard processing means including an engaging device; and a feeding means for detaching the gizzards from the poultry and delivering them to the engaging device in a given orientation to be engaged thereby in said orientation, said feeding means including a rotatable worm means positioned generally parallel to said path and at an elevation and position to intercept the gut with the carcass on one side of the worm and the stomach on the opposite side, power means connected to the worm means to rotate the latter in a direction such that the gut is conveyed in said direction, a knife blade having a cutting edge along said worm means adjacent the one end thereof and between the support for the worm means and the other end, whereby the worm means will move the gut into the edge to sever the gut and release the stomach and gizzard, chute means below the worm means at the knife to receive and convey the released stomach and gizzard along a given path with one of the two preceding the other along the chute means.

19. An apparatus for processing a poultry gizzard with the stomach attached, said apparatus including: a gizzard slitting knife; gizzard cleaning means; gizzard lining peeling means; and power means including conveying means to sequentially engage and move a gizzard past said knife to at least partially split the gizzard, to move the split gizzard past the cleaning means to remove the contents of the split gizzard, and to move the cleaned gizzard to the peeling means for removal of the gizzard lining, said peeling means including means to remove the stomach from the gizzard after the two are received by the peeling means.

20. An apparatus as set forth in claim 19, wherein said peeling means includes a pair of rolls having interengaging helical ribs, power means operatively connected to said rolls to rotate said rolls in a direction such that gizzards deposited thereon are moved by the rolls toward one end thereof, one portion of said rolls defining a narrow slot therebetween, said slot being sufficiently large to receive a stomach and small enough to prevent the passage of a gizzard therethrough.

21. An apparatus as set forth in claim 20, wherein said conveying means being positioned with respect to the rolls to introduce the stomach into said slot before depositing the gizzard on the rolls, and wherein said one portion is spaced from said one end of the rolls.

22. An apparatus for processing a split poultry gizzard with the stomach attached and including: gizzard lining removal means comprising a pair of rolls having interengaging helical ribs, power means operatively connected to said rolls to rotate said rolls in a direction such that gizzards deposited thereon are moved by the rolls toward one end thereof, said rolls defining a narrow slot therebetween adjacent the other ends of the rolls, said slot being sufficiently large to receive a stomach and small enough to prevent the passage of a gizzard therethrough; and means to introduce the stomach into said slot and to deposit the gizzards on said rolls.

23. An apparatus for processing a split poultry gizzard with the stomach attached including: processing means comprising a pair of helically ribbed peeling rolls, power means connected to said rolls to rotate the same to remove the lining of a gizzard deposited thereon with the lining facing the rolls, said rolls having juxtaposed portions of an external diameter smaller than the remainder of the rolls, said portions being sufficiently smaller in diameter to permit a stomach to pass therebetween and to engage the stomach and to pull it in a direction away from the gizzard, and means to restrain the gizzard while the stomach is being pulled in said direction.

24. In an apparatus for processing poultry gizzards including endless conveyer means trained for movement along a path having a generally horizontal portion, which at one end defines a pickup station and at the other a discharge station with the endless means moving in a given direction therebetween, and cutting means positioned above said portion between said stations, and in a plane parallel to said portion, and a spray head above said portion between said cutting means and said discharge station, the improvement comprising: feed means aligned with said portion at the pickup station, said feed means having power means to move gizzards therealong to said pickup station; and pivoted means at said pickup station pivotal about a generally horizontal axis and positioned to urge the gizzards downwardly into contact with said conveyer means, said pivoted means having portions at each side of said plane and adapted swing by opposite sides of the cutting means.

25. In an apparatus as set forth in claim 24, wherein said feed means includes a trough and water jet means to urge gizzards in said trough in said direction.

26. In an apparatus as set forth in claim 25, wherein said trough has a central longitudinal groove with raised ledges at each side thereof.

27. An apparatus for processing poultry including: endless conveyer means trained for movement along a path having a generally horizontal portion, which at one end defines a pickup station and at the other a discharge station with the endless means moving in a given direction therebetween, and cutting means positioned above said portion between said stations and in a plane parallel to said portion; a spray head above said portion between said cutting means and said discharge station; feed means aligned with said portion at the pickup station, said feed means having power means to move gizzards therealong to said pickup station; pivoted means at said pickup station pivotal about a generally horizontal axis and positioned to urge the gizzards downwardly into contact with said conveyor means, said pivoted means having portions at each side of said plane and adapted swing by opposite sides of the cutting means; and gizzard lining removal means positioned below said portion at said discharge station to receive the gizzards from said conveyer means.

28. An apparatus as set forth in claim 27, wherein said lining removal means includes a pair of power driven peeling rolls, and means to align the gizzards on the rolls.

29. An apparatus for processing poultry including: endless conveyer means trained for movement along a path having a generally horizontal portion, which at one end defines a pickup station and at the other a discharge station with the endless means moving in a given direction therebetween; cutting means positioned above said portion between said stations; a spray head above said portion between said cutting means and said discharge station; feed means aligned with said portion at the pickup station, said feed means having power means to move gizzards therealong to said pickup station; and gizzard lining removal means positioned below said portion at said discharge station to receive the gizzards from said conveyer means, said lining removal means including a pair of power driven peeling rolls, each of said rolls having a portion of reduced diameter in juxtaposition to the corresponding portion of the other roll.

30. An apparatus for processing poultry including: endless conveyer means trained for movement along a path having a generally horizontal portion, which at one end defines a pickup station and at the other a discharge station with the endless means moving in a given direction therebetween; cutting means positioned above said portion between said stations; a spray head above said portion between said cutting means and said discharge station; feed means aligned at the pickup station; and gizzard lining removal means positioned at the discharge station to receive the gizzards from said conveyer means, said lining removal means including a pair of power driven peeling rolls having interengaging helical ribs, said rolls being rotated in a direction such that gizzards received from said conveying means are moved toward an end of the rolls, said removal means including means to stop said movement of the gizzards toward said end before the gizzards reach said end.

31. An apparatus as set forth in claim 30, wherein said means to stop the movement of the gizzards includes a shelf approximately level with the top of the rolls.

32. In a gizzard peeling machine including a pair of interengaging helically ribbed peeling rolls, journaled in spaced bearings and extending therebetween, the improvement comprising: each of said rolls between said bearings having a portion of reduced diameter in juxtaposition to the corresponding portion of the other roll.

33. In a machine as set forth in claim 32, and including power means to drive the peeling rolls, said power means being directly coupled to only one of said rolls, with the one roll in turn driving the other roll through the interengaging ribs.

34. In a machine as set forth in claim 32, and including ribbed cleaning rolls interengaging with said portions of the ribbed peeling rolls.

35. In a gizzard peeling machine including a pair of juxtaposed helically ribbed peeling rolls power driven in a direction such that gizzards deposited thereon are moved towards one end of the rolls, the improvement comprising: shelf means adjacent said one end and at about the level of the tops of the rolls whereby the rolls move the gizzards onto said shelf means.

36. In a gizzard processing apparatus, the improvement comprising: feeding means including a feed trough having a longitudinal groove and shelves at each side of the groove, said groove being of a size to receive only a small portion of the gizzards with the remainder thereof being supported on said shelves.

37. In an apparatus as set forth in claim 36, wherein said trough has side walls along the outer sides of the shelves, said feeding means including water jets directed longitudinally along the trough.

38. A gizzard processing apparatus including: a conveyer trained for movement along a given path; power means connected to said conveyer to move said conveyer in a given direction; a pair of grippers mounted on said conveyer for movement along said path in said direction, said grippers being constructed to releasably engage a gizzard and move the gizzard sequentially past a series of points along a conveyer, whereby at first point along said path a gizzard may be inserted in the grippers to be held thereby; a knife positioned at a second point along said path in said direction from the first point to at least partially split the gizzard to expose the interior thereof; cleaning means at a third point along said path in said direction from said second point to remove the contents of the split gizzard; gizzard lining peeling means, a part of said peeling means being positioned at a fourth point along said path in said direction from said third point, said part being below the grippers at said fourth point; and means at said fourth point to open said grippers to release said gizzard onto said peeling means with the exposed interior of the gizzard resting on the peeling means.

39. A gizzard processing apparatus including: a conveyer having an upper generally horizontal run and a lower generally horizontal run; power means connected to said conveyer to move said conveyor in a given direction; a pair of grippers mounted on said conveyer for movement therewith, said grippers being constructed to releasably engage a gizzard, whereby at a first point along said upper run a gizzard may be inserted into the grippers to be held thereby and moved in said direction along a predetermined path; a knife positioned at a second point along said path in said direction from the first point to at least partially split the gizzard, said second point being located at a position at which said gizzard will be at least partially inverted; a pair of cleaning rolls positioned in said direction from said second point and below said lower run, said rolls being approximately parallel to said path with at least their upper portions in said path to contact the split gizzard; power means connected to said rolls to rotate said upper portions away from each other to spread the split gizzard; gizzard lining peeling means having a part located below said grippers beyond said cleaning rolls in said direction; and means located above said part to open said grippers and release said gizzard onto said peeling means.

40. A gizzard processing apparatus including: a conveyer having an upper generally horizontal run and a lower generally horizontal run; power means connected to said conveyer to move said conveyer in a given direction; a holder including a frame attached to said conveyer, a pair of opposed, spaced grippers having teeth for engaging a gizzard, said grippers being mounted on said frame for movement of the teeth of one gripper toward and away from the teeth of the other gripper, and a movable trigger on said frame to releasably hold said grippers with said teeth spaced from each other, whereby at a first point along said upper run a gizzard may be inserted into the grippers to be held thereby and moved in said direction along a predetermined path; a knife positioned at a second point along said path in said direction from the first point to at least partially split the gizzard, said second point being located at a position at which said gizzard will be at least partially inverted; a pair of cleaning rolls positioned in said direction beyond said second point and below said lower run, said rolls being parallel to said path with at least their upper portions in said path to contact the split gizzard; power means connected to said rolls to rotate said upper portions away from each other to spread and clean the split gizzard; gizzard lining peeling means having a part located below said grippers beyond, in said direction, said cleaning rolls; and means located above said part to open said grippers and release said gizzard onto said peeling means.

41. A gizzard processing apparatus including: a conveyer having an upper generally horizontal run and a lower generally horizontal run; power means connected to said conveyer to move said conveyer in a given direction; a holder including a frame attached to said conveyer, a pair of grippers having opposed, spaced teeth, said grippers being pivotally mounted on said frame for movement between a first position at which the teeth are spaced from each other and a second position at which the teeth are substantially closer together, means resiliently urging said grippers toward said second position, a trigger positioned between said teeth and pivotally attached adjacent one end to said frame, said trigger having abutments on the sides thereof adjacent the other end thereof to contact the gripper teeth and hold said grippers in the first position, said trigger being movable to position said abutments out of contact with said teeth and release said grippers for movement to said second position, and means resiliently urging said trigger toward the position at which said abutments contact the gripper teeth; whereby at a first point along said upper run a gizzard may be inserted into the grippers to be held thereby and moved in said direction along a predetermined path; a knife positioned at a second point along said path in said direction from the first point to at least partially split the gizzard; cleaning means at a third point along said path in said direction from said second point to remove the contents of the split gizzard; gizzard lining peeling means, a part of said peeling means being positioned at a fourth point along said path in said direction from said third point, said part being below the grippers at said fourth point; and means at said fourth point to open said grippers to release said gizzard onto said peeling means.

42. A gizzard processing apparatus including: a conveyer trained for movement along a given path; power means connected to said conveyer to move said conveyer in a given direction; a holder including a frame attached to said conveyer, a pair of grippers having opposed, spaced teeth, said grippers being pivotally mounted on said frame for movement between a first position at which the teeth are spaced from each other and a second position at which the teeth are substantially closer together, means resiliently urging said grippers toward said second position, a trigger positioned between said teeth and pivotally attached adjacent one end to said frame, said trigger having abutments on the sides thereof adjacent the other end thereof to contact the gripper teeth and hold said grippers in the first position, said trigger being movable to position said abutments out of contact with said teeth and release said grippers for movement to said second position, and means resiliently urging said trigger toward the position at which said abutments contact the gripper teeth; whereby at a first point along said path a gizzard may be inserted into the grippers to be held thereby and moved in said direction; a knife positioned at a second point along said path in said direction from the first point to at least partially split the gizzard; cam means located between the first and second points to move said grippers together to a given position; cleaning means at a third point along said path in said direction from said second point to remove the contents of the split gizzard; gizzard lining peeling means, a part of said peeling means being positioned at a fourth point along said path in said direction from said third point, said part being below the grippers at said fourth point; and cam means at said fourth point to open said grippers to release said gizzard and to allow said trigger to return to the position at which said abutments contact the gripper teeth.

43. A gizzard processing apparatus including: a gizzard slitting knife; gizzard cleaning means including a pair of approximately horizontal cleaning rolls; gizzard lining peeling means; and power means including conveying means to sequentially engage and move a gizzard past said knife to at least partially split the gizzard, to move the split gizzard past the cleaning means to remove the contents of the split gizzard, to move the cleaned gizzard to the peeling means for removal of the gizzard lining, and to remove the gizzard from said peeling means.

44. Apparatus for processing a poultry gizzard with the stomach attached, said apparatus including: a gizzard slitting knife; gizzard cleaning means; gizzard lining peeling means, said peeling means comprising a pair of rotating and interengaging helically ribbed rolls, whereby a gizzard deposited on one end of said rolls will be moved to the other end while being peeled; power means to engage a gizzard and to sequentially move a gizzard past said knife to at least partially split the gizzard, to move the split gizzard past the cleaning means to remove the contents of the split gizzard and to deposit the gizzard on said rolls; means beyond the other end of the rolls to grasp the stomach and pull it away from said other end; rotating cutting means having a generally circular cutting edge positioned at said other end of the rolls with the edge spaced from the rolls a distance sufficient to permit the stomach to pass therebetween and sufficiently small to prevent passage of the gizzard, whereby as the stomach is pulled away and the gizzard pulled against the cutting means the two will be separated by the cutting means; and means to remove the gizzard from the rolls.

45. Apparatus for processing a poultry gizzard with the stomach attached, said apparatus including: a conveyer having an upper generally horizontal run and a lower generally horizontal run; power means connected to said conveyer to move said conveyer in a given direction; a pair of grippers mounted on said conveyer for movement along therewith, said grippers being constructed to releasably engage a gizzard, whereby at a point along said upper run a gizzard may be inserted into the grippers to be held thereby and moved in said direction along a predetermined path; a knife positioned at a second point along said path in said direction from the first point to at least partially split the gizzard; a pair of cleaning rolls positioned in said direction beyond said second point and below said lower run, said rolls being parallel to said path with at least their upper portions in said path to contact the split gizzard; power means connected to said rolls to rotate said upper portions away from each other to spread and clean the split gizzard; gizzard lining peeling means, said peeling means comprising a pair of rotating and interengaging helically ribbed peeling rolls, whereby a gizzard deposited on one end of said peeling rolls will be moved to the other end while being peeled, cylindrical pulling means of a smaller size than said peeling rolls, extending from the other end of the peeling rolls and affixed thereto, whereby the stomach will pass between and be grasped by said pulling means to be drawn away from the other end of the peeling rolls, said peeling means having one end of the peeling rolls located below said grippers beyond said cleaning rolls in said direction; means located above said one end of said peeling rolls to open said grippers and release said gizzard onto said peeling means; rotating cutting means having a generally circular cutting edge positioned at said other end of the peeling rolls with the edge spaced from the rolls a distance sufficient to permit the stomach to pass therebetween and sufficiently small to prevent passage of the gizzard, whereby as the stomach is grasped by the pulling means and pulled and the gizzard pulled against the cutting means the stomach and gizzard will be separated by the cutting means; and means to remove the gizzard from the peeling rolls.

46. An apparatus for use in a gizzard processing machine having a conveyer means trained for movement along a path in a given direction, said apparatus including: a frame having an attachment means to secure said frame to said conveyer means; a pair of gizzard grippers mounted on said frame, one of said grippers being movable between a first position at which it is spaced from the other and a second position at which it is adjacent the first gripper; a trigger mounted on said frame to releasably hold said one gripper in the first position and being movable to a second position at which said gripper is released, whereby at a first point along said path a gizzard may be inserted between said grippers and said trigger moved to said second position to release said gripper; means positioned at a second point along said path in said direction from said first point to move said one gripper to the second position to hold said gizzard; and means positioned at a third point along said path in said direction from said second point to move said gripper from said second to said first position and to return said trigger to the initial position.

47. A gizzard holder for use in a gizzard processing machine having a conveyer means, said holder including: a frame having an attachment means to secure said frame to said conveyer means; a pair of gizzard grippers mounted on said frame, one of said grippers being movable between a first position at which it is spaced from the other and a second position at which it is adjacent the first gripper, said grippers having gizzard contacting portions; a trigger releasably holding said one gripper in said first position; and means to move the said one gripper toward the second position when said trigger releases the same.

48. A gizzard holder for use in a gizzard processing machine having a conveyer means, said holder including: a frame having an attachment means to secure said frame to said conveyer means; a pair of opposed, spaced grippers having teeth for engaging a gizzard, said grippers being mounted on said frame for movement of said teeth of one gripper toward and away from the teeth of the other gripper; a movable trigger on said frame to releasably hold said grippers with said teeth spaced from each other and having a contact face between said grippers and below the top thereof, the distance between said face and said teeth being substantially less than the height of a gizzard; and means to move said grippers in a direction such that the teeth approach each other when said trigger is released.

49. A gizzard holder for use in a gizzard processing machine having a conveyer means, said holder including: a frame having an attachment means to secure said frame to said conveyer means; a pair of grippers having opposed, spaced teeth, said grippers being pivotally mounted on said frame for movement between a first position at which the teeth are spaced from each other and a second position at which the teeth are substantially closer together; means resiliently urging said grippers toward said second position; a trigger positioned between said teeth and pivotally attached adjacent one end thereof to said frame, said trigger having abutments on the sides thereof adjacent the other end thereof to contact the gripper teeth and hold said grippers in the first position, said trigger being movable to position said abutments out of contact with said teeth to release said grippers for movement to said second position; and means resiliently urging said trigger toward the position at which said abutments contact the gripper teeth.

50. An apparatus for use in a poultry gizzard processing, said apparatus including: a conveyer having a chain trained for movement along a path; a gizzard holder including a frame attached to said chain, a pair of gizzard grippers pivotally attached to said chain with their pivotal axes parallel to the chain at opposite sides thereof and normally biased in a gripping position, holding means on said grippers at one side of said axes to contact opposite sides of a gizzard and hold the same, the portions of said grippers at the other side of the axes forming actuating arms; cam means at a first point in said path to contact the two adjacent sides of the arms to assure that the arms have moved to gizzard engaging position; and cam means at a second point in said path to contact the two outside sides of said arms to separate said holding means and release the gizzard therebetween.

51. An apparatus for use in conjunction with a gizzard lining peeling machine including a pair of interengaging helically ribbed, power driven, peeling rolls employed to remove the lining from a split and cleaned poultry gizzard with the stomach attached thereto which after cleaning is moved to the discharge end of the rolls by the rotation thereof, said apparatus including: power operated pulling means at the discharge end of the rolls to engage the stomach and pull it away from said end; and means at said discharge end to prevent the gizzard from moving off said end while permitting the stomach to pass off said discharge end to be engaged by said pulling means.

52. An apparatus for use in processing a split poultry gizzard with the stomach attached, said apparatus including: a frame; a pair of interengaging helically ribbed rolls rotatably mounted on said frame; power means attached to the rolls to rotate the rolls in a direction such that a gizzard and stomach deposited on one end of the rolls will be moved to the other; pulling means at the other end of the rolls to engage the stomach and pull it away from said end; rotating cutting means having a generally circular cutting edge positioned at said other end of the rolls with the edge spaced from the rolls a distance sufficient to permit the stomach to pass therebetween and sufficiently small to prevent passage of the gizzard, whereby as the stomach is pulled away and the gizzard pulled against the cutting means the two will be separated by the cutting means; and means to remove the gizzard from the rolls.

53. An apparatus for use in processing a split poultry gizzard with the stomach attached, said apparatus including: a frame; power means; a pair of interengaging helically ribbed rolls rotatably mounted on said frame, the ribs of said rolls having a pitch in excess of twice the external diameter of the rolls, said rolls having a portion adjacent one end thereof of reduced diameter and defining an abutment between the ends of the rolls, said rolls connected to said power means for rotation in a direction that a gizzard deposited on the rolls at a distance from said one end will be moved toward said one end; a cutter having a generally circular cutting edge about an axis, said cutter being mounted on the frame for rotation about its circular axis, with its axis parallel to a plane which includes the axis of one of the rolls and with said edge adjacent said abutment and between the abutment and said one end, said cutter being connected to said power means for rotation of the cutter; and a knocker means affixed to the cutter on the side thereof opposite said one end of the rolls to remove a gizzard from a position on the rolls adjacent the cutter.

54. In a gizzard processing apparatus, the improvement comprising: a gizzard holder including a frame, a pair of gizzard grippers mounted on the frame for movement toward each other from a spaced position, said holder defining an opening between said spaced grippers, spring means contacting the grippers and urging them toward each other, and trigger means mounted on the frame and releasably latching said grippers in said spaced position, said trigger means being movable downwardly, when said opening is upwardly, to unlatch said grippers to permit them to move toward each other; an endless conveyer trained for movement along a path having two portions, said frame being attached to said conveyer in a position such that said opening is upwardly along one of the two portions and downwardly along the other portion, whereby along said one portion a gizzard may be inserted between the grippers and the trigger depressed to unlatch the grippers to engage the gizzard; and opening means positioned along the other portion to engage the grippers and move them apart to the spaced position to release the gizzard and permit the trigger to move downwardly to the latched position.

55. In an apparatus as set forth in claim 54, wherein said trigger is positioned between the spaced grippers and below said opening when said holder is in said one portion, and wherein said grippers are pivotally mounted on said frame for movement with respect thereto transversely to said path, said grippers each having an arm extending upwardly when said holder is in said other portion, said conveyer includes power means to move the holder along said path, and the opening means comprises a pair of cams positioned to contact said grippers to move them apart, said cams being positioned above and at opposite sides of said other portion to contact said arms and pivot them toward each other.

56. In an apparatus as set forth in claim 55, including cutting means positioned along said path to intersect and cut the gizzard as the holder moves past the knife after the gizzard is loaded in the holder and before the holder reaches the opening means, and a second cam means positioned to contact the arms and pivot them away from each other as the holder passes the cutting means.

57. A gizzard processing apparatus including: a gizzard slitting knife; gizzard cleaning means; gizzard lining peeling means including a pair of cleaning rolls, having interengaging conformation thereon with the conformations being helically aligned and rotated in a predetermined direction such that a gizzard deposited adjacent one end of the rolls will be moved towards the other end of the rolls; and power means including conveying means to sequentially engage and move a gizzard past said knife to at least partially split the gizzard, to move the split gizzard past the cleaning means to remove the contents of the split gizzard, and to move the cleaned gizzard to the peeling means for removal of the gizzard lining and to deposit said gizzard adjacent said one end of the peeling means.

58. An apparatus for processing poultry gizzards including: a frame; gizzard conveying means mounted in said frame and comprising an endless chain trained for movement along a path from a loading station to a discharge station, said chain having gizzard engaging means thereon; a rotatably mounted circular knife having a cutting edge positioned adjacent said chain between said loading station and said discharge station; power means connected to said knife to rotate the same; spray means spaced from said chain between said knife and said discharge station and aligned to direct a water spray toward said chain; and peeling means including a pair of peeling rolls having interengaging helical ribs, said rolls being rotated in a direction such that a gizzard thereon will be moved in the direction of from one end to the other, said rolls being positioned with a portion thereof adjacent said one end at said discharge station and said other end spaced from said discharge station, the arrangement being such that the gizzards at said discharge station will be moved by gravity from said conveying means to said rolls.

References Cited by the Examiner

UNITED STATES PATENTS

| | | | |
|---|---|---|---|
| 2,700,793 | 2/55 | Terry et al. | 17—45 |
| 2,701,386 | 2/55 | Strickler | 17—45 |
| 2,739,345 | 3/56 | Kristmann et al. | 17—11 |
| 2,787,362 | 4/57 | Hill. | |
| 2,787,806 | 4/57 | Jett et al. | 17—11 |
| 2,791,798 | 5/57 | Shickel et al. | 17—77 |
| 2,908,935 | 10/59 | Shrader | 17—11 |

SAMUEL KOREN, *Primary Examiner.*

LUCIE H. LAUDENSLAGER, *Examiner.*

UNITED STATES PATENT OFFICE
CERTIFICATE OF CORRECTION

Patent No. 3,172,148                          March 9, 1965

Carl J. Hill

It is hereby certified that error appears in the above numbered patent requiring correction and that the said Letters Patent should read as corrected below.

Column 1, line 50, for "relatvely" read -- relatively --; column 3, line 17, for "which" read -- with --; line 19, for "flour" read -- floor --; column 10, line 57, for "30" read -- 230 --; column 15, line 58, for "form" read -- worm --; column 18, line 70, after "rolls" strike out the comma; column 19, line 33, for "in" read -- into --; column 24, line 48, for "conformation" read -- conformations --.

Signed and sealed this 27th day of July 1965.

(SEAL)
Attest:

ERNEST W. SWIDER                             EDWARD J. BRENNER
Attesting Officer                               Commissioner of Patents